(12) United States Patent
Morita et al.

(10) Patent No.: US 10,175,402 B2
(45) Date of Patent: Jan. 8, 2019

(54) PHASE DIFFERENCE FILM LAYERED BODY HAVING LAYER WITH SPECIFIED RATIO OF POLYPHENYLENE ETHER TO POLYSTYRENE-BASED POLYMER AND METHOD FOR PRODUCING THE SAME

(71) Applicant: ZEON CORPORATION, Tokyo (JP)

(72) Inventors: Takashi Morita, Tokyo (JP); Kohei Fujii, Tokyo (JP); Tomokazu Kinohira, Tokyo (JP); Shunsuke Yamanaka, Tokyo (JP); Taku Hatano, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 131 days.

(21) Appl. No.: 14/385,197

(22) PCT Filed: Feb. 26, 2013

(86) PCT No.: PCT/JP2013/055001
§ 371 (c)(1),
(2) Date: Sep. 15, 2014

(87) PCT Pub. No.: WO2013/136975
PCT Pub. Date: Sep. 19, 2013

(65) Prior Publication Data
US 2015/0062702 A1 Mar. 5, 2015

(30) Foreign Application Priority Data
Mar. 15, 2012 (JP) .................. 2012-058876

(51) Int. Cl.
| | | |
|---|---|---|
| *G02B 5/30* | (2006.01) | |
| *G02B 1/08* | (2006.01) | |
| *B29C 47/06* | (2006.01) | |
| *B29D 11/00* | (2006.01) | |
| *B29C 55/00* | (2006.01) | |
| *B29C 55/02* | (2006.01) | |
| *B29C 55/04* | (2006.01) | |
| *B29C 47/00* | (2006.01) | |
| *G02B 27/28* | (2006.01) | |
| *B29K 25/00* | (2006.01) | |
| *G02B 1/04* | (2006.01) | |

(52) U.S. Cl.
CPC ........ *G02B 5/3083* (2013.01); *B29C 47/0021* (2013.01); *B29C 47/0057* (2013.01); *B29C 47/06* (2013.01); *B29C 47/065* (2013.01); *B29C 55/00* (2013.01); *B29C 55/023* (2013.01); *B29C 55/045* (2013.01); *B29D 11/0073* (2013.01); *G02B 1/08* (2013.01); *G02B 5/3033* (2013.01); *B29K 2025/08* (2013.01); *G02B 1/04* (2013.01); *G02B 27/28* (2013.01)

(58) Field of Classification Search
USPC ...... 264/1.24, 1.29, 1.31, 1.34, 1.7, 1.9, 2.7, 264/171.1, 173.11, 173.12, 173.14, 264/173.15, 173.16, 173.19, 174.1; 359/56, 75, 84, 96–99, 102, 103, 359/117–121, 489.01–489.04, 489.07, 359/489.15; 428/1.1, 1.3, 1.31
See application file for complete search history.

(56) References Cited

U.S. PATENT DOCUMENTS

| | | | | |
|---|---|---|---|---|
| 4,373,065 | A | * 2/1983 | Prest, Jr. | G02B 1/02 264/1.1 |
| 5,130,356 | A | * 7/1992 | Feuerherd | C07C 39/15 428/64.4 |
| 6,565,974 | B1 | * 5/2003 | Uchiyama | G02B 1/10 428/412 |
| 2004/0209977 | A1 | * 10/2004 | Hossan | B29C 47/0014 523/324 |
| 2007/0083035 | A1 | * 4/2007 | Riding | C08F 6/005 528/480 |
| 2008/0198446 | A1 | * 8/2008 | Asakura | G02B 5/208 359/352 |

FOREIGN PATENT DOCUMENTS

| | | | |
|---|---|---|---|
| JP | H02-264737 A | | 10/1990 |
| JP | 06059121 A | * | 3/1994 |
| JP | H06-59121 A | | 3/1994 |
| JP | H07-266414 A | | 10/1995 |
| JP | H09234786 A | | 9/1997 |
| JP | 2003-177244 A | | 6/2003 |
| JP | 2003177244 A | * | 6/2003 |
| JP | 2010-078905 A | | 4/2010 |

(Continued)

OTHER PUBLICATIONS

Apr. 16, 2013 Written Opinion of the International Searching Authority issued in PCT/JP2013/055001.

(Continued)

*Primary Examiner* — Stephone B Allen
*Assistant Examiner* — Ryan S Dunning
(74) *Attorney, Agent, or Firm* — Oliff PLC

(57) ABSTRACT

A phase difference film layered body is obtained by stretching a film before stretching, the film before stretching including: a P1 layer formed of a resin p1 containing polyphenylene ether having a positive intrinsic birefringence value and a polystyrene-based polymer having a negative intrinsic birefringence value and having a syndiotactic structure; and a P2 layer disposed in contact with the P1 layer and formed of a resin p2 containing an acrylic resin or an alicyclic structure-containing polymer. In the resin p1, the weight ratio of (the content of the polyphenylene ether)/(the content of the polystyrene-based polymer) is 35/65 to 45/55. A method for producing the phase difference film layered body and a method for producing a phase difference film using the phase difference film layered body are also provided.

11 Claims, No Drawings

(56) References Cited

FOREIGN PATENT DOCUMENTS

| JP | 2011-113004 A | 6/2011 | | |
|---|---|---|---|---|
| JP | 2011-118137 A | 6/2011 | | |
| JP | 5640745 B2 * | 12/2014 | ........... | B29C 55/023 |
| WO | 2010/074166 A1 | 7/2010 | | |
| WO | 2012/090791 A1 | 7/2012 | | |

OTHER PUBLICATIONS

Apr. 16, 2013 International Search Report issued in Application No. PCT/JP2013/055001.

* cited by examiner

PHASE DIFFERENCE FILM LAYERED BODY HAVING LAYER WITH SPECIFIED RATIO OF POLYPHENYLENE ETHER TO POLYSTYRENE-BASED POLYMER AND METHOD FOR PRODUCING THE SAME

FIELD

The present invention relates to a phase difference film layered body and a method for producing the same, and to a method for producing a phase difference film using the phase difference film layered body.

BACKGROUND

In display devices such as liquid crystal display devices, a phase difference film may be used for, e.g., correcting a retardation (phase difference). The phase difference film may be a stretched film obtained by stretching a long-length pre-stretch film formed from a resin to orient molecules contained in the film. Such a stretched film is preferable because this can be easily produced.

Many studies have been made on such phase difference films formed from the stretched films. For example, there are known techniques such as those in Patent Literatures 1 to 4. Among these, Patent Literatures 1 to 3 disclose techniques for producing a phase difference film having inverse wavelength distribution property as a stretched film. The inverse wavelength distribution property is a property in which, as the wavelength of light passing through the phase difference film becomes longer, an in-plane direction retardation imparted to the light increases.

CITATION LIST

Patent Literature

Patent Literature 1: International Publication No. WO 2010/074166
Patent Literature 2: Japanese Patent Application Laid-Open No. 2011-113004 A
Patent Literature 3: Japanese Patent Application Laid-Open No. 2010-78905 A
Patent Literature 4: Japanese Patent Application Laid-Open No. Hei. 07-266414 A

SUMMARY

Technical Problem

In recent years, there is an increasing demand for reducing thickness of display devices, such as liquid display devices. Therefore, there is a need for a phase difference film having much thinner thickness than those of prior-art phase difference films.

However, in general, thickness reduction of a film brings about its strength degradation, and induces breakage of the film. Particularly, a phase difference film formed from a stretched film tends to be easily broken in the step of stretching a pre-stretch film. Therefore, when an attempt is made to produce a thin phase difference film using a prior art technique, it is difficult to perform stable production.

In a phase difference film having inverse wavelength distribution property, a material having a negative intrinsic birefringence value such as polystyrene is sometimes used. However, most of materials with negative intrinsic birefringence values have low strength. Therefore, it is particularly difficult to stably produce thin phase difference films with inverse wavelength distribution property.

As a possible strategy for making a phase difference film with inverse wavelength distribution property less breakable, a composition prepared by mixing a material having low strength such as polystyrene and another material having high strength may be employed. However, when the material having high strength is mixed, the relative ratio of the material with a negative intrinsic birefringence value such as polystyrene is reduced. Therefore, the thickness of the phase difference film has to be increased in order to obtain a desired retardation, which makes it difficult to reduce the thickness of the phase difference film.

As another possible strategy for making the phase difference film less breakable, a combination of a low-strength layer and a high-strength layer may be employed to form a phase difference film having a multi-layer structure. However, when such a multi-layer structure is used, the increase in the number of the layers results in increase in the thickness of the phase difference film. Therefore this strategy also makes it difficult to reduce the thickness of the phase difference film.

The present invention has been created in view of the foregoing problems, and it is an object to provide a phase difference film layered body and a method for producing the phase difference film layered body that enables stable production of a phase difference film that is thinner than prior-art products, and to provide a phase difference film produced using the phase difference film layered body.

Solution to Problem

The present inventors have conducted extensive studies to solve the foregoing problems and found out a pre-stretch film that has high strength and is less breakable even when the film is stretched, where this pre-stretch film includes: a P1 layer consisting of a resin p1 including a combination of polyphenylene ether and a polystyrene-based polymer having a prescribed structure at a prescribed weight ratio; and a P2 layer disposed in contact with the P1 layer and consisting of a resin p2 containing an acrylic resin or an alicyclic structure-containing polymer. The inventors have also found out that when this pre-stretch film is stretched, a sufficient retardation is expressed in the P1 layer. The inventors have further found out that, in the stretched film obtained by stretching the aforementioned pre-stretch film (i.e., a phase difference film layered body), the P1 layer and the P2 layer can be easily removed from each other. On the basis of the aforementioned findings, the inventors have found that a thin phase difference film having the P1 layer can be obtained by removing the P2 layer from the aforementioned stretched film, and thus the present invention has been completed.

Accordingly, the present invention is as follows.

[1] A phase difference film layered body obtained by stretching a pre-stretch film, the pre-stretch film including: a P1 layer consisting of a resin p1 containing polyphenylene ether having a positive intrinsic birefringence value and a polystyrene-based polymer having a negative intrinsic birefringence value and having a syndiotactic structure; and a P2 layer disposed in contact with the P1 layer and consisting of a resin p2 containing an acrylic resin or an alicyclic structure-containing polymer, wherein in the resin p1, a weight ratio of (a content of the polyphenylene ether)/(a content of the polystyrene-based polymer) is 35/65 to 45/55.

[2] The phase difference film layered body according to [1], wherein
a weight average molecular weight of the polyphenylene ether is 15,000 to 100,000, and
a weight average molecular weight of the polystyrene-based polymer is 130,000 to 300,000.

[3] The phase difference film layered body according to [1] or [2], wherein, in a layer portion of the phase difference film layered body excluding the P2 layer, an in-plane direction retardation $Re_{450}$ of light having a wavelength of 450 nm, an in-plane direction retardation $Re_{550}$ of light having a wavelength of 550 nm, and an in-plane direction retardation $Re_{650}$ of light having a wavelength of 650 nm satisfy a relationship of $Re_{450} < Re_{550} < Re_{650}$.

[4] The phase difference film layered body according to any one of [1] to [3], wherein the phase difference film layered body is a long-length film and has a slow axis in a diagonal direction with respect to a lengthwise direction of the phase difference film layered body.

[5] The phase difference film layered body according to [4], wherein the phase difference film layered body has the slow axis in a direction inclined at an angle of 40° or more and 50° or less with respect to the lengthwise direction.

[6] A method for producing the phase difference film layered body according to any one of [1] to [5], the method comprising the steps of:
obtaining a pre-stretch film by co-extruding a resin p1 and a resin p2, the resin p1 containing a polyphenylene ether having a positive intrinsic birefringence value and a polystyrene-based polymer having a negative intrinsic birefringence value and having a syndiotactic structure, a weight ratio of (a content of the polyphenylene ether)/(a content of the polystyrene-based polymer) being 35/65 to 45/55, the resin p2 containing an acrylic resin or an alicyclic structure-containing polymer; and
stretching the pre-stretch film.

[7] The method according to claim 6, wherein the stretching is performed at a film temperature of Tg−20° C. to Tg+20° C. where Tg is a glass transition temperature of the resin p1.

[8] The method according to claim 6 or 7, wherein
the pre-stretch film obtained in the step of obtaining the pre-stretch film is a long-length film, and
in the stretching step, the pre-stretch film is stretched in a diagonal direction with respect to the lengthwise direction of the pre-stretch film.

[9] The method according to claim 8, wherein, in the step of stretching, the pre-stretch film is stretched in a direction inclined at an angle of 40° or more and 50° or less with respect to the lengthwise direction of the pre-stretch film.

[10] A method for producing a phase difference film, the method comprising removing the P2 layer from the phase difference film layered body according to any one of claims 1 to 5.

Advantageous Effects of Invention

The phase difference film layered body of the present invention has high strength and thus can be stably produced even when the phase difference film is thin.

According to the method for producing the phase difference film layered body of the present invention, a phase difference film layered body that enables stable production of a thin phase difference film can be produced.

According to the method for producing the phase difference film of the present invention, breakage during production can be prevented, and a thin phase difference film can be stably produced.

DESCRIPTION OF EMBODIMENTS

The present invention will be described hereinbelow in detail by way of embodiments and exemplifications. However, the present invention is not limited to the following embodiments and exemplifications and may be implemented with any modifications without departing from the scope of the claims of the present invention and the scope of equivalents thereto.

In the following description, "(meth)acrylic" means "acrylic", "methacrylic", or a combination thereof, and "(meth)acrylate" means "acrylate", "methacrylate", or a combination thereof.

An MD direction (machine direction) is a direction of flow of a film in a production line and usually represents a direction coincident with the lengthwise direction of a long-length film. A TD direction (traverse direction) is a direction parallel to a film surface and orthogonal to the MD direction and usually represents a direction coincident with the width direction of the long-length film.

Unless otherwise specified, "retardation" means in-plane direction retardation (phase difference in an in-plane direction). The in-plane direction retardation at each measurement wavelength is a value represented by $|nx-ny| \times d$. Retardation in a thickness direction is a value represented by $\{|nx+ny|/2-nz\} \times d$. In the aforementioned formulas, nx represents a refractive index in a direction that is orthogonal to the thickness direction (an in-plane direction) and gives the maximum refractive index. ny represents a refractive index in a direction that is orthogonal to the thickness direction (an in-plane direction) and also orthogonal to the direction of nx. nz represents a refractive index in the thickness direction. d represents a film thickness.

[1. Phase Difference Film Layered Body]

The phase difference film layered body of the present invention is a film having a multi-layer structure and obtained by stretching a pre-stretch film including a P1 layer consisting of a resin p1 and a P2 layer consisting of a resin p2 and disposed in contact with the P1 layer.

[1-1. Resin p1]

The resin p1 contains polyphenylene ether having a positive intrinsic birefringence value and a polystyrene-based polymer having a negative intrinsic birefringence value and having a syndiotactic structure. A positive intrinsic birefringence value means that a refractive index in a stretching direction is larger than a refractive index in a direction orthogonal to the stretching direction. A negative intrinsic birefringence value means that the refractive index in the stretching direction is smaller than the refractive index in the direction orthogonal to the stretching direction. The intrinsic birefringence value may be calculated from a electropermittivity distribution.

Polyphenylene ether is a polymer having a structural unit formed by polymerization of phenylene ether or a phenylene ether derivative. Usually, a polymer having, in its main chain, a structural unit having a phenylene ether skeleton (hereinafter appropriately referred to as a "phenylene ether unit") is used as the polyphenylene ether. The benzene ring in the phenylene ether unit may have a substituent, so long as the effects of the invention are not significantly impaired.

Particularly, the polyphenylene ether is preferably a polymer containing a phenylene ether unit represented by the following formula (I).

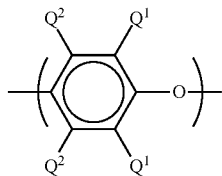

(1)

In the formula (I), each $Q^1$ independently represents a halogen atom, a lower alkyl group (for example, an alkyl group having 7 or less carbon atoms), a phenyl group, a haloalkyl group, an aminoalkyl group, a hydrocarbon oxy group, or a halohydrocarbon oxy group (with a proviso that a halogen atom and an oxygen atom are separated by at least two carbon atoms). Of these, as $Q^1$, an alkyl group and a phenyl group are preferable, and an alkyl group having 1 or more and 4 or less carbon atoms is particularly preferable.

In the formula (I), each $Q^2$ independently represents a hydrogen atom, a halogen atom, a lower alkyl group (for example, an alkyl group having 7 or less carbon atoms), a phenyl group, a haloalkyl group, a hydrocarbon oxy group, or a halohydrocarbon oxy group (with a proviso that a halogen atom and an oxygen atom are separated by at least two carbon atoms). Of these, a hydrogen atom is preferable as $Q^2$.

The polyphenylene ether may be a homopolymer having one type of structural unit or a copolymer having two or more types of structural units.

When the polymer containing the structural unit represented by the formula (I) is a homopolymer, preferable examples of the homopolymer may include a homopolymer having a 2,6-dimethyl-1,4-phenylene ether unit (a structural unit represented by "—$(C_6H_2(CH_3)_2$—O)—").

When the polymer containing the structural unit represented by the formula (I) is a copolymer, preferable examples of the copolymer may include a random copolymer having a combination of a 2,6-dimethyl-1,4-phenylene ether unit and a 2,3,6-trimethyl-1,4-phenylene ether unit (a structural unit represented by "—$(C_6H(CH_3)_3$—O—)—").

The polyphenylene ether may contain a structural unit other than the phenylene ether unit. In this case, the polyphenylene ether is a copolymer having the phenylene ether unit and a structural unit other than the phenylene ether unit. However, it is preferable that the content of the structural unit other than the phenylene ether unit in the polyphenylene ether is small to the extent that the effects of the present invention are not significantly impaired. More specifically, the content of the phenylene ether unit in the polyphenylene ether is preferably 50% by weight or more, more preferably 70% by weight or more, and still more preferably 80% by weight or more.

As the polyphenylene ether, one type thereof may be solely used, or two or more types thereof may be used in combination at any ratio.

The weight average molecular weight of the polyphenylene ether is preferably 15,000 or more, more preferably 25,000 or more, and still more preferably 35,000 or more and is preferably 100,000 or less, more preferably 85,000 or less, and still more preferably 70,000 or less. When the weight average molecular weight is equal to or more than the lower limit of the aforementioned range, the strength of the P1 layer can be increased. When the weight average molecular weight is equal to or less than the upper limit, the dispersibility of the polyphenylene ether can be increased, so that the polyphenylene ether and the styrene-based polymer can be mixed with high uniformity.

As the weight average molecular weight, a standard polystyrene-equivalent value employed. The value is measured by a gel permeation chromatography (GPC) at a temperature of 135° C. using 1,2,4-trichlorobenzene as a solvent.

No particular limitation is imposed on the method for producing the polyphenylene ether. For example, the polyphenylene ether may be produced by a method described in Japanese Patent Application Laid-Open No. Hei. 11-302529 A.

The polystyrene-based polymer is a polymer containing a structural unit formed by polymerization of a styrene-based monomer (this structural unit may be appropriately referred to as a "styrene-based unit"). Examples of the styrene-based monomer may include styrene and styrene derivatives. Examples of the styrene derivatives may include a styrene derivative having a substituent at the benzene ring or at an a position of styrene.

Examples of the styrene-based monomer may include: styrene; alkyl styrenes such as methylstyrene and 2,4-dimethylstyrene; halogenated styrenes such as chlorostyrene; halogen-substituted alkyl styrenes such as chloromethylstyrene; and alkoxy styrenes such as methoxystyrene. Particularly, the styrene-based monomer is preferably styrene with no substituent. As the styrene-based monomer, one type thereof may be solely used, or two or more types thereof may be used in combination at any ratio.

As the polystyrene-based polymer in the resin p1, a polystyrene-based polymer having a syndiotactic structure is used. The polystyrene-based polymer having a syndiotactic structure means that the stereochemical structure of the polystyrene-based polymer is a syndiotactic structure. The syndiotactic structure is a stereo structure in which, in a Fischer projection formula, phenyl groups, which are side chains, are located alternately on opposite sides with respect to the main chain formed from carbon-carbon bonds.

The tacticity (stereoregularity) of the polystyrene polymer may be quantified by a nuclear magnetic resonance method using a carbon isotope ($^{13}$C-NMR method). The tacticity measured by the $^{13}$C-NMR method may be represented by the existence ratio of constituent units that are successively present in plurality. Generally, e.g., two successive structural units constitute a dyad, three successive structural units constitute a triad, and five successive structural units constitute a pentad. In this case, the polystyrene-based polymer having a syndiotactic structure has a syndiotacticity of preferably 75% or more and more preferably 85% or more based on racemic diads or a syndiotacticity of preferably 30% or more and more preferably 50% or more based on racemic pentads.

Examples of the polystyrene-based polymer may include polystyrene, poly(alkylstyrene), poly(halogenated styrene), poly(halogenated alkylstyrene), poly(alkoxystyrene), poly(vinylbenzoic acid ester), hydrogenated polymers thereof, and copolymers thereof.

Examples of the poly(alkylstyrene) may include poly(methylstyrene), poly(ethylstyrene), poly(isopropylstyrene), poly(t-butylstyrene), poly(phenylstyrene), poly(vinylnaphthalene), and poly(vinylstyrene).

Examples of the poly(halogenated styrene) may include poly(chlorostyrene), poly(bromostyrene), and poly(fluorostyrene).

Examples of the poly(halogenated alkylstyrene) may include poly(chloromethylstyrene).

Examples of the poly(alkoxystyrene) may include poly(methoxystyrene) and poly(ethoxystyrene).

Of these, polystyrene, polyp-methylstyrene), poly(m-methylstyrene), poly(p-t-butylstyrene), poly(p-chlorostyrene), poly(m-chlorostyrene), poly(p-fluorostyrene), hydrogenated polystyrene, and copolymers containing these structural units are particularly preferable as the polystyrene-based polymer.

The polystyrene-based polymer may be a homopolymer having only one type of structural unit or may be a copolymer having two or more types of structural units. When the polystyrene-based polymer is a copolymer, the copolymer may contain two or more types of styrene-based units or may contain a styrene-based unit and a structural unit other than the styrene-based unit. When the polystyrene-based polymer is a copolymer containing a styrene-based unit and a structural unit other than the styrene-based unit, it is preferable that the content of the structural unit other than the styrene-based unit in the polystyrene-based polymer is small to the extent that the effects of the present invention are not significantly impaired. Specifically, the content of the styrene-based unit in the polystyrene-based polymer is preferably 80% by weight or more, more preferably 83% by weight or more, and still more preferably 85% by weight or more. Usually, when the amount of the styrene-based unit is within the aforementioned range, a desired retardation can be expressed in a phase difference film to be produced.

As the polystyrene-based polymer, one type thereof may be solely used, or two or more types thereof may be used in combination at any ratio.

The weight average molecular weight of the polystyrene-based polymer is preferably 130,000 or more, more preferably 140,000 or more, and still more preferably 150,000 or more and is preferably 300,000 or less, more preferably 270,000 or less, and still more preferably 250,000 or less. When the weight average molecular weight is as described above, the polystyrene-based polymer can have a high glass transition temperature, and the heat resistance of the phase difference film can thereby be stably improved.

The glass transition temperature of the polystyrene-based polymer is preferably 85° C. or higher, more preferably 90° C. or higher, and still more preferably 95° C. or higher. By raising the glass transition temperature of the polystyrene-based polymer as described above, the glass transition temperature of the resin p1 can be effectively raised, and furthermore the heart resistance of the phase difference film can be stably improved. From the viewpoint of producing the phase difference film layered body easily and stably, the glass transition temperature of the polystyrene-based polymer is preferably 160° C. or lower, more preferably 155° C. or lower, and still more preferably 150° C. or lower.

The polystyrene-based polymer having the syndiotactic structure may be produced by, e.g., polymerization of a styrene-based monomer using, as catalysts, a titanium compound and a condensation product of water and trialkylaluminium in an inert hydrocarbon solvent or in the absence of a solvent (see Japanese Patent Application Laid-Open No. Sho. 62-187708 A). The polyhalogenated alkylstyrene) may be produced by, e.g., a method described in Japanese Patent Application Laid-Open No. Hei. 1-46912 A. The aforementioned hydrogenated polymers may be produced by, e.g., a method described in Japanese Patent Application Laid-Open No. Hei. 1-178505 A.

In the resin p1, the weight ratio of (the content of the polyphenylene ether)/(the content of the polystyrene-based polymer) is 35/65 to 45/55. The weight ratio of (the content of the polyphenylene ether)/(the content of the polystyrene-based polymer) is preferably 36.5/63.5 or more and more preferably 38/62 or more and is preferably 43.5/56.5 or less and more preferably 42/58 or less. When the ratio of the polyphenylene ether to polystyrene-based polymer is equal to or more than the lower limit of the aforementioned range, the relative amount of the polyphenylene ether can be increased to thereby increase the strength of the resin p1 and removability of the P2 layer from the P1 layer. When the ratio is equal to or less than the upper limit, the positive intrinsic birefringence value of the polyphenylene ether and the negative intrinsic birefringence value of the polystyrene-based polymer are balanced, and inverse wavelength distribution property can thereby be developed. In addition, the dispersibility of the polyphenylene ether can be increased, so that highly uniform mixing of the polyphenylene ether and the styrene-based polymer can be achieved.

The resin p1 may contain a component other than the polyphenylene ether and the polystyrene-based polymer, so long as the effects of the invention are not significantly impaired.

For example, the resin p1 may contain a polymer other than the aforementioned polyphenylene ether and polystyrene-based polymer. The amount of the polymer other than the polyphenylene ether and polystyrene-based polymer is preferably 15 parts by weight or less, more preferably 10 parts by weight or less, and particularly preferably 5 parts by weight or less relative to 100 parts by weight of the total amount of the polyphenylene ether and the polystyrene-based polymer.

The resin p1 may also contain, e.g., an additive. Examples of the additive may include: lamellar crystal compounds; fine particles; stabilizers such as an antioxidant, a thermostabilizer, a light stabilizer, a weathering stabilizer, an ultraviolet absorber, and a near infrared absorber; a plasticizer; coloring agents such as a dye and a pigment; and an antistatic agent. As the additive, one type thereof may be solely used, or two or more types thereof may be used in combination at any ratio.

The amount of the additive may be appropriately set within the range in which the effects of the present invention are not significantly impaired. For example, the amount may be set within the range in which the total light transmittance of the phase difference film can be maintained at 85% or higher.

Among the aforementioned additives, fine particles and an ultraviolet absorber are preferable as additives because they can improve flexibility and weather resistance.

Examples of the fine particles may include: inorganic particles such as silicon dioxide, titanium dioxide, magnesium oxide, calcium carbonate, magnesium carbonate, barium sulfate, and strontium sulfate particles; and organic particles such as polymethyl acrylate, polymethyl methacrylate, polyacrylonitrile, cellulose acetate, and cellulose acetate propionate particles. Of these, organic particles are preferable.

Examples of the ultraviolet absorber may include an oxybenzophenone-based compound, a benzotriazole-based compound, a salicylate ester-based compound, a benzophenone-based ultraviolet absorber, a benzotriazole-based ultraviolet absorber, an acrylonitrile-based ultraviolet absorber, a triazine-based compound, a nickel complex salt-based compound, and an inorganic powder. Preferable examples of the ultraviolet absorber may include 2,2'-methylenebis(4-(1,1,3,3-tetramethylbutyl)-6-(2H-benzotriazole-2-yl)phenol), 2-(2'-hydroxy-3'-tert-butyl-5'-methylphenyl)-5-chlorobenzotriazole, 2,4-di-tert-butyl-6-(5-chlorobenzotriazole-2-yl)phenol, 2,2'-dihydroxy-4,4'-dimethoxybenzophenone, and 2,2',4,4'-tetrahydroxybenzophenone. Particularly preferable examples may include 2,2'-methylenebis(4-(1,1,3,3-tetramethylbutyl)-6-(2H-benzotriazole-2-yl)phenol).

The glass transition temperature of the resin p1 is preferably 115° C. or higher, more preferably 120° C. or higher, and still more preferably 125° C. or higher. Since the resin p1 contains a combination of the polyphenylene ether and the polystyrene-based polymer, the glass transition temperature can be increased as compared with that of a resin containing only the polystyrene-based polymer. By having such a high glass transition temperature, the orientational relaxation of the resin p1 can be reduced, so that a phase difference film having good heat resistance can be achieved. No particular limitation is imposed on the upper limit of the glass transition temperature of the resin p1, but the upper limit is usually 200° C. or lower.

Usually, the haze of the resin p1 is small. This is because, since the polyphenylene ether and the polystyrene-based polymer have high dispersibility, the polyphenylene ether and the polystyrene-based polymer can be easily kneaded. The specific range of the haze may be set in accordance with the degree of transparency required for the phase difference film. For example, the haze value of the resin p1 at a thickness of 1 mm is preferably 10% or less, more preferably 5% or less, and ideally 0%.

[1-2. Resin p2]

The resin p2 is a resin containing an acrylic resin or an alicyclic structure-containing polymer.

[1-2-1. Acrylic Resin]

The acrylic resin is a resin containing an acrylic polymer. The acrylic polymer means a polymer of (meth)acrylic acid or a derivative of (meth)acrylic acid. Examples of the acrylic polymer may include homopolymers and copolymers of acrylic acid, acrylic acid esters, acrylamide, acrylonitrile, methacrylic acid, methacrylic acid esters, etc. Since the acrylic resin has high strength and hardness, the P2 layer can appropriately protect the P1 layer, so that the strength of the phase difference film layered body can be increased.

The acrylic polymer is preferably a polymer containing a structural unit formed by polymerization of a (meth)acrylic acid ester. Examples of the (meth)acrylic acid ester may include alkyl esters of (meth)acrylic acid. Particularly, a (meth)acrylic acid ester having a structure derived from (meth)acrylic acid and an alkanol or cycloalkanol having 1 to 15 carbon atoms is preferable, and a (meth)acrylate having a structure derived from (meth)acrylic acid and an alkanol having 1 to 8 carbon atoms is more preferable. When the number of carbon atoms is small as described above, rupture elongation of the phase difference film layered body can be increased.

Specific examples of the acrylic acid ester may include methyl acrylate, ethyl acrylate, n-propyl acrylate, i-propyl acrylate, n-butyl acrylate, i-butyl acrylate, sec-butyl acrylate, t-butyl acrylate, n-hexyl acrylate, cyclohexyl acrylate, n-octyl acrylate, 2-ethylhexyl acrylate, n-decyl acrylate, and n-dodecyl acrylate.

Specific examples of the methacrylic acid ester may include methyl methacrylate, ethyl methacrylate, n-propyl methacrylate, i-propyl methacrylate, n-butyl methacrylate, i-butyl methacrylate, sec-butyl methacrylate, t-butyl methacrylate, n-hexyl methacrylate, n-octyl methacrylate, 2-ethylhexyl methacrylate, n-decyl methacrylate, and n-dodecyl methacrylate.

The aforementioned (meth)acrylic acid ester may have a substituent such as a hydroxyl group or a halogen atom, so long as the effects of the present invention are not significantly impaired. Examples of the (meth)acrylic acid ester having such a substituent may include 2-hydroxyethyl acrylate, 2-hydroxypropyl acrylate, 4-hydroxybutyl acrylate, 2-hydroxyethyl methacrylate, 2-hydroxypropyl methacrylate, 4-hydroxybutyl methacrylate, 3-chloro-2-hydroxypropyl methacrylate, and glycidyl methacrylate. One type thereof may be solely used, or two or more types thereof may be used in combination at any ratio.

The acrylic polymer may be a polymer of only (meth)acrylic acid or a derivative of (meth)acrylic acid or may be a copolymer of (meth)acrylic acid or a derivative of (meth)acrylic acid with a monomer copolymerizable therewith. Examples of the copolymerizable monomer may include $\alpha,\beta$-ethylenic unsaturated carboxylic acid ester monomers other than (meth)acrylic acid esters, $\alpha,\beta$-ethylenic unsaturated carboxylic acid monomers, alkenyl aromatic monomers, conjugated diene monomers, non-conjugated diene monomers, esters of carboxylic acids and unsaturated alcohols, and olefin monomers. One type thereof may be solely used, or two or more types thereof may be used in combination at any ratio.

Specific examples of the $\alpha,\beta$-ethylenic unsaturated carboxylic acid ester monomers other than (meth)acrylic acid esters may include dimethyl fumarate, diethyl fumarate, dimethyl maleate, diethyl maleate, and dimethyl itaconate.

The $\alpha,\beta$-ethylenic unsaturated carboxylic acid monomer may be any of monocarboxylic acids, polycarboxylic acids, partial esters of polycarboxylic acids, and anhydrides of polycarboxylic acids. Specific examples thereof may include crotonic acid, maleic acid, fumaric acid, itaconic acid, monoethyl maleate, mono-n-butyl fumarate, maleic anhydride, and itaconic anhydride.

Specific examples of the alkenyl aromatic monomers may include styrene, $\alpha$-methylstyrene, methyl-$\alpha$-methylstyrene, vinyltoluene, and divinylbenzene.

Specific examples of the conjugated diene monomers may include 1,3-butadiene, 2-methyl-1,3-butadiene, 1,3-pentadiene, 2,3-dimethyl-1,3-butadiene, 2-chloro-1,3-butadiene, and cyclopentadiene.

Specific examples of the non-conjugated diene monomers may include 1,4-hexadiene, dicyclopentadiene, and ethylidene norbornane.

Specific examples of the esters of carboxylic acids and unsaturated alcohols may include vinyl acetate.

Specific examples of the olefin monomers may include ethylene, propylene, butene, and pentene.

When the acrylic polymer contains a copolymerizable monomer, the content of the structural unit formed by polymerization of (meth)acrylic acid or a derivative of (meth)acrylic acid in the acrylic polymer is preferably 50% by weight or more, more preferably 85% by weight or more, and particularly preferably 90% by weight or more.

As the acrylic polymer, one type thereof may be solely used, or two or more types thereof may be used in combination at any ratio.

Among the aforementioned acrylic polymers, polymethacrylates are preferable, and polymethyl methacrylate is more preferable.

The acrylic resin may contain rubber particles. When the acrylic resin contains the rubber particles, the flexibility of the acrylic resin can be increased, and the shock resistance of the phase difference film layered body can thereby be improved. In addition, the rubber particles form irregularities on the surface of the P2 layer, and the area of contact on the surface of the P2 layer is reduced. Therefore, usually, slidability on the surface of the P2 layer can be increased.

Examples of the rubber forming the rubber particles may include acrylic acid ester polymer rubbers, polymer rubbers composed mainly of butadiene, and ethylene-vinyl acetate copolymer rubbers. Examples of the acrylic acid ester polymer rubber may include rubbers containing butyl acrylate, 2-ethylhexyl acrylate, etc. as a main component of the monomer unit. Of these, acrylic acid ester polymer rubber containing butyl acrylate as a main component and polymer rubber containing butadiene as a main component are preferable.

The rubber particles may contain two or more types of rubbers. These rubbers may be uniformly mixed or may be layered. Examples of the rubber particles containing layered rubbers may include particles in which the layers form a core-shell structure. The core may be formed from a rubber elastic component obtained by grafting an alkyl acrylate such as butyl acrylate and styrene. The shell may be a hard resin layer formed from a copolymer of an alkyl acrylate with one or both of polymethyl methacrylate and methyl methacrylate.

The number average particle diameter of the rubber particles is preferably 0.05 μm or more and more preferably 0.1 μm or more and is preferably 0.3 μm or less and more preferably 0.25 μm or less. When the number average particle diameter is within the aforementioned range, appropriate irregularities can be formed on the surface of the P2 layer to improve the slidability of the phase difference film layered body.

The amount of the rubber particles is preferably 5 parts by weight or more and preferably 50 parts by weight or less relative to 100 parts by weight of the acrylic polymer. When the amount of the rubber particles is within the aforementioned range, the shock resistance of the phase difference film layered body can be increased to thereby improve handleability.

The acrylic resin may contain a component other than the acrylic polymer and the rubber particles, so long as the effects of the invention are not significantly impaired. For example, the acrylic resin may contain a polymer other than the acrylic polymer. However, from the viewpoint of exerting the advantages of the present invention to a significant degree, it is preferable that the amount of the polymer other than the acrylic polymer in the resin p2 is small. For example, the specific amount of the polymer other than the acrylic polymer is preferably 10 parts by weight or less, more preferably 5 parts by weight or less, and still more preferably 3 parts by weight or less relative to 100 parts by weight of the acrylic polymer. Particularly preferably, the acrylic resin contains no polymer other than the acrylic polymer.

The acrylic resin may contain, e.g., an additive. Examples of the additive may include the same additives as those that may be contained in the resin p1. As the additive, one type thereof may be solely used, or two or more types thereof may be used in combination at any ratio. The amount of the additive may be appropriately set within the range in which the effects of the present invention are not significantly impaired.

The glass transition temperature of the acrylic resin is preferably 90° C. or higher, more preferably 95° C. or higher, and still more preferably 100° C. or higher and is preferably 145° C. or lower, more preferably 140° C. or lower, and still more preferably 135° C. or lower. When the glass transition temperature of the acrylic resin is equal to or higher than the lower limit of the aforementioned range, blocking of resin pellets during drying at high temperature can be suppressed, so that contamination of the resin pellets with water can be prevented. When the glass transition temperature of the acrylic resin is equal to or lower than the upper limit, the temperature for molding by melt extrusion can be lowered, so that existence of heterogeneous objects in the film can be avoided.

[1-2-2. Resin Containing Alicyclic Structure-Containing Polymer]

The alicyclic structure-containing polymer is a polymer having an alicyclic structure in the repeating unit of the polymer, and any of a polymer having an alicyclic structure in its main chain and a polymer having an alicyclic structure in a side chain may be used. As the alicyclic structure-containing polymer, one type thereof may be solely used, or two or more types thereof may be used in combination at any ratio. Particularly, from the viewpoint of mechanical strength, heat resistance, etc., a polymer containing an alicyclic structure in its main chain is preferable.

Examples of the alicyclic structure may include saturated alicyclic hydrocarbon (cycloalkane) structures and unsaturated alicyclic hydrocarbon (cycloalkene or cycloalkyne) structures. Of these, the cycloalkane structures and cycloalkene structures are preferable from the viewpoint of mechanical strength, heat resistance, etc, and the cycloalkane structures are particularly preferable.

The number of carbon atoms constituting one alicyclic structure is preferably 4 or more and more preferably 5 or more and is preferably 30 or less, more preferably 20 or less, and particularly preferably 15 or less. The number of carbon atoms within the aforementioned range is preferable because the mechanical strength, heat resistance, and moldability into film are highly balanced.

The ratio of the repeating unit having the alicyclic structure in the alicyclic structure-containing polymer may be appropriately selected in accordance with the application purpose. The ratio is preferably 55% by weight or more, more preferably 70% by weight or more, and particularly preferably 90% by weight or more. It is preferable from the viewpoint of the heat resistance of the P2 layer that the ratio of the repeating unit having the alicyclic structure in the alicyclic structure-containing polymer is within the aforementioned range.

Examples of the alicyclic structure-containing polymer may include norbornene-based polymers, monocyclic olefin-based polymers, cyclic conjugated diene-based polymers, vinyl alicyclic hydrocarbon-based polymers, and hydrogenated products thereof. Of these, norbornene-based polymers are preferable because they have good moldability.

Examples of the norbornene-based polymers may include: a ring-opening polymer of a monomer having a norbornene structure, a ring-opening copolymer of a monomer having a norbornene structure with another monomer, and hydrogenated products thereof; and an addition polymer of a monomer having a norbornene structure, an addition copolymer of a monomer having a norbornene structure with another monomer, and hydrogenated products thereof. Of these, a hydrogenated ring-opening (co)polymer of a monomer having a norbornene structure is particularly preferable from the viewpoint of moldability, heat resistance, low hygroscopicity, size stability, light weight etc. The term "(co)polymer" refers to a polymer and a copolymer.

Examples of the monomer having a norbornene structure may include bicyclo[2.2.1]hept-2-ene (trivial name: norbornene), tricyclo[4.3.0.1$^{2,5}$]deca-3,7-diene (trivial name: dicyclopentadiene), 7,8-benzotricyclo[4.3.0.1$^{2,5}$]deca-3-ene (trivial name: methanotetrahydrofluorene), tetracyclo[4.4.0.1$^{2,5}$.1$^{7,10}$]dodeca-3-ene (trivial name: tetracyclododecene), and derivatives of these compounds (for example, compounds having substituents on their rings). Examples of the substituents may include alkyl groups, alkylene groups, and polar groups. A plurality of substituents may be bonded to the ring, and these substituents may be the same or different from each other. As the monomer having a norbornene structure, one type thereof may be solely used, or two or more types thereof may be used in combination at any ratio.

Examples of the type of the polar group may include heteroatoms and atomic groups having a heteroatom. Examples of the heteroatoms may include an oxygen atom, a nitrogen atom, a sulfur atom, a silicon atom, and halogen atoms. Specific examples of the polar group may include a carboxyl group, a carbonyloxycarbonyl group, an epoxy group, a hydroxyl group, an oxy group, an ester group, a silanol group, a silyl group, an amino group, a nitrile group, and a sulfonic acid group.

Examples of the monomer copolymerizable with the monomer having a norbornene structure through ring-opening may include: monocyclic olefins such as cyclohexene, cycloheptene, and cyclooctene and derivatives thereof; and cyclic conjugated dienes such as cyclohexadiene and cycloheptadiene and derivatives thereof.

As the monomer copolymerizable with the monomer having a norbornene structure through ring-opening, one type thereof may be solely used, or two or more types thereof may be used in combination at any ratio.

The ring-opening polymer of the monomer having a norbornene structure and the ring-opening copolymer of the monomer having a norbornene structure with a monomer copolymerizable therewith may be produced by, e.g., polymerization or copolymerization of the monomer(s) in the presence of a known ring-opening polymerization catalyst.

Examples of the monomer addition-copolymerizable with the monomer having a norbornene structure may include: α-olefins having 2 to 20 carbon atoms such as ethylene, propylene, and 1-butene and derivatives thereof; cycloolefins such as cyclobutene, cyclopentene, and cyclohexene, and derivatives thereof; and non-conjugated dienes such as 1,4-hexadiene, 4-methyl-1,4-hexadiene, and 5-methyl-1,4-hexadiene. Of these, α-olefins are preferable, and ethylene is more preferable. As the monomer addition-copolymerizable with the monomer having a norbornene structure, one type thereof may be solely used, or two or more types thereof may be used in combination at any ratio.

The addition polymer of the monomer having a norbornene structure and the addition copolymer of the monomer having a norbornene structure with a monomer copolymerizable therewith may be produced by, e.g., polymerization or copolymerization of the monomer(s) in the presence of a known addition polymerization catalyst.

Examples of the monocyclic olefin-based polymer may include addition polymers of monocyclic olefin-based monomers such as cyclohexene, cycloheptene, and cyclooctene.

Examples of the cyclic conjugated diene-based polymer may include: polymers obtained by cyclization reaction of addition polymers of conjugated diene-based monomers such as 1,3-butadiene, isoprene, and chloroprene; 1,2- and 1,4-addition polymers of cyclic conjugated diene-based monomers such as cyclopentadiene and cyclohexadiene; and hydrogenated products thereof.

Examples of the vinyl alicyclic hydrocarbon polymers may include: polymers of vinyl alicyclic hydrocarbon-based monomers such as vinylcyclohexene and vinylcyclohexane and hydrogenated products thereof; hydrogenated products obtained by hydrogenating aromatic ring portions contained in polymers prepared by polymerization of vinyl aromatic hydrocarbon-based monomers such as styrene and α-methylstyrene; and aromatic ring hydrogenated products of copolymers, such as random copolymers and block copolymers, of vinyl alicyclic hydrocarbon-based monomers and vinyl aromatic hydrocarbon-based monomers with monomers copolymerizable with these vinyl aromatic hydrocarbon-based monomers. Examples of the block copolymers may include diblock copolymers, triblock copolymers, and higher multi-block copolymers, and graded block copolymers.

The molecular weight of the alicyclic structure-containing polymer is appropriately selected in accordance with the application purpose. The weight average molecular weight (Mw) in terms of polyisoprene or polystyrene measured by gel permeation chromatography using cyclohexane as a solvent (when the sample does not dissolve in cyclohexane, toluene may be used) is preferably 10,000 or more, more preferably 15,000 or more, and still more preferably 20,000 or more and is preferably 100,000 or less, more preferably 80,000 or less, and still more preferably 50,000 or less. When the weight average molecular weight is within the aforementioned range, the mechanical strength and moldability of the phase difference film layered body are highly balanced and thus preferable.

The molecular weight distribution (weight average molecular weight (Mw)/number average molecular weight (Mn)) of the alicyclic structure-containing polymer is preferably 1.2 or more, more preferably 1.5 or more, and still more preferably 1.8 or more and is preferably 3.5 or less, more preferably 3.0 or less, and still more preferably 2.7 or less. When the molecular weight distribution exceeds 3.5, the amount of low-molecular weight components increases, and therefore the amount of components with short relaxation time increases. In this case, it is presumed that relaxation during high-temperature exposure increases in a short period of time, so that the stability of the film may deteriorate. When the polymer has a molecular weight distribution of less than 1.2, such a polymer brings about low productivity and high cost. Therefore, such a polymer is not much realistic from a practical point of view.

The glass transition temperature of the alicyclic structure-containing polymer is preferably 130° C. or higher and more preferably 135° C. or higher and is preferably 150° C. or lower and more preferably 145° C. or lower. When the glass transition temperature is lower than 130° C., durability at high temperature may deteriorate. Although the polymer having a glass transition temperature of higher than 150° C. may have high durability, usual stretching process on such a polymer may be difficult.

The saturated water absorption rate of the alicyclic structure-containing polymer is preferably 0.03% by weight or less, more preferably 0.02% by weight or less, and particularly preferably 0.01% by weight or less. When the saturated water absorption rate is within the aforementioned range, changes in the properties of the film over the lapse of time can be reduced.

The saturated water absorption rate is a percentage value of an increase in the weight of a test piece after immersion in water at a certain temperature for a certain period of time with respect to the weight of the test piece before immersion. Usually, the measurement is performed by immersing the test piece in water at 23° C. for 24 hours. The saturated water absorption rate of the alicyclic structure-containing polymer may be adjusted within the aforementioned range by, e.g., reducing the amount of polar groups in the alicyclic structure-containing polymer. From the viewpoint of reducing the saturated water absorption rate to a still lower degree, it is preferable that the alicyclic structure-containing polymer has no polar groups.

The resin containing the alicyclic structure-containing polymer may contain an optional component other than the alicyclic structure-containing polymer, so long as the effects of the invention are not significantly impaired. Examples of the optional component may include additives such as: coloring agents such as pigments and dyes; a plasticizer; a fluorescent brightening agent; a dispersant; a thermostabilizer; a light stabilizer; an ultraviolet absorber; an antistatic agent; an antioxidant; fine particles; and a surfactant. As such a component, one type thereof may be solely used, or two or more types thereof may be used in combination at any ratio. The amount of the alicyclic structure-containing polymer in the resin containing the alicyclic structure-containing polymer is generally 50% by weight to 100% by weight or 70% by weight to 100% by weight.

[1-3. Pre-Stretch Film]

The pre-stretch film is a film having a multi-layer structure including the P1 layer and the P2 layer. The pre-stretch film for use is usually an isotropic raw film. However, a film subjected to stretching treatment may be used as the pre-stretch film, and this film may be further subjected to stretching treatment to produce a phase difference film layered body.

The P1 layer is a layer consisting of the resin p1. Although the pre-stretch film may include two or more P1 layers, the pre-stretch film usually includes only one P1 layer.

The thickness of the P1 layer is set to a suitable value such that the phase difference film including the stretched P1 layer expresses a desired retardation. The specific thickness of the P1 layer in the pre-stretch film is preferably 10 μm or more and more preferably 50 μm or more from the viewpoint of obtaining sufficient retardation and mechanical strength and is preferably 800 μm or less and more preferably 600 μm or less from the viewpoint of obtaining high flexibility and good handleability.

The P2 layer is a layer consisting of the resin p2. Although the pre-stretch film may include only one P2 layer, it is preferable that the pre-stretch film includes two or more P2 layers. Particularly preferable examples of the pre-stretch film may include a pre-stretch film including a first P2 layer, a P1 layer, and a second P2 layer in this order. In such a pre-stretch film, the P1 layer can be protected by the high-strength P2 layers that sandwich the P1 layer from opposite sides, so that bleedout from the P1 layer can be effectively prevented. The bleedout from the P1 layer is a phenomenon in which part of the components (for example, an additive) contained in the P1 layer bleeds out through the surface of the P1 layer.

Upon producing the phase difference film, the P2 layers are removed from the phase difference film layered body. Therefore, usually, the phase difference film does not include P2 layers, and the retardation in the P2 layers does not affect the retardation in the phase difference film. Unlike the P1 layer, the thickness of each P2 layer may be set without being limited by expression of retardation. The specific thickness of the P2 layer in the pre-stretch film is within the range of preferably 0.3 times or more of the thickness of the P1 layer and more preferably 0.5 time or more and preferably 5.0 times or less and more preferably 3.0 times or less. When the pre-stretch film has a plurality of P2 layers, it is preferable that each single layer has a thickness within the aforementioned range.

The P1 layer and each P2 layer are in direct contact with each other with no other layer interposed therebetween. When the pre-stretch film has two or more P1 or P2 layers, it is preferable that at least one pair of the P1 layer and the P2 layer are in direct contact with each other. Particularly preferably, all of the pairs of the P1 layer and the P2 layer are in direct contact with each other. This is because, upon production of the phase difference film, the operation for removing the P2 layer from the P1 layer of the phase difference film layered body can thereby be easily performed taking advantage of the property that the P2 layer can be easily removed from the P1 layer.

Usually, the pre-stretch film is prepared as a long-length film. When the pre-stretch film is a long-length film, the phase difference film layered body can also be produced as a long-length film. A "long-length" film is a film having a length at least 5 times longer than its width and preferably at least 10 times longer than the width and more specifically is a film having a length that allows the film to be wound into a roll for storage or conveyance. In a production line of a long-length film, production steps may be performed while the film is continuously conveyed in its lengthwise direction. Therefore, upon production of the phase difference film, part of or all the steps can be performed in-line, so that the production can be performed simply and efficiently. No limitation is imposed on the upper limit of the length of the long-length film, but the upper limit may be usually 5,000 times or less.

In the pre-stretch film, variation in the thickness of the P1 layer over its entire surface are preferably 1 μm or less. This can reduce unevenness in the color tone of the phase difference film. In addition, changes in the color tone of the phase difference film after long-term use can be made uniform.

The variation in the thickness of the P1 layer over its entire surface can be reduced to 1 μm or less by using any of the following procedures when, e.g., a co-extrusion molding method is used: (1) providing a polymer filter with an opening of 20 μm or less in an extruder; (2) rotating a gear pump at 5 rpm or faster; (3) providing enclosing means around a die; (4) setting an air gap to 200 mm or less; (5) performing edge pinning when the film is casted onto a cooling roller; and (6) using a twin screw extruder or a single screw extruder having a double flight type screw as the extruder.

The thickness of the P1 layer can be determined as follows. The total film thickness is measured using a commercial contact type thickness meter. Then a portion of which the thickness has been measured is cut, and the cross-section thereof is observed under an optical microscope, to determine the ratio of each layer. From the ratio, the thickness of the P1 layer may be calculated. This procedure may be repeated at constant intervals in the lengthwise direction and the width direction of the film, to determine the average thickness value $T_{ave}$ and the thickness variation.

The thickness variation (μm) is larger one of $T_{ave}-T_{min}$ and $T_{max}-T_{ave}$. $T_{ave}$ is the arithmetic mean of the vales measured in the aforementioned measurement. $T_{max}$ is the maximum value of the measured thicknesses T, and $T_{min}$ is the minimum value.

It is preferable to reduce the amount of a residual solvent in the pre-stretch film. Examples of the means for reducing the amount of the residual solvent may include: (1) means in which the amount of the residual solvent in the resins used as raw materials is reduced; and (2) means in which the resins are pre-dried before the pre-stretch film is molded. The pre-drying is performed by, e.g., preparing the resin in a form of pellets and then treating the pellets with a hot air dryer. The drying temperature is preferably 100° C. or higher, and the drying time is preferably 2 hours or longer. By performing the pre-drying, the residual solvent in the pre-stretch film can be reduced, and the extruded sheet-shaped resins can be prevented from being foamed.

Examples of the method for producing the pre-stretch film may include: co-extrusion molding methods such as a co-extrusion T-die method, a co-extrusion inflation method, and a co-extrusion lamination method; film lamination forming methods such as dry lamination; a co-flow casting method; and a coating forming method in which the surface of a resin film is coated with a resin solution. Of these, co-extrusion molding methods are preferable from the viewpoint of production efficiency and of avoiding existence of the residual volatile component such as a solvent in the pre-stretch film.

When the co-extrusion molding method is used, the pre-stretch film may be obtained by, e.g., co-extrusion of the resin p1 and the resin p2. Examples of the co-extrusion molding method may include a co-extrusion T-die method, a co-extrusion inflation method, and a co-extrusion lamination method. Of these, the co-extrusion T-die method is preferable. Examples of the co-extrusion T-die method may include a feed block procedure and a multi-manifold procedure. The multi-manifold procedure is particularly preferable because thickness variation can thereby be reduced.

When the co-extrusion T-die method is used, the melting temperature of the resins in an extruder having a T-die is set to a temperature higher than the glass transition temperatures of the resins p1 and p2 by preferably 80° C. or higher and more preferably 100° C. or higher and by preferably 180° C. or lower and more preferably 150° C. or lower. By setting the melting temperature in the extruder to be equal to or higher than the lower limit of the aforementioned range, the flowability of the resins can be sufficiently increased. By setting the melting temperature to be equal to or lower than the upper limit, deterioration of the resins can be prevented.

In the extrusion molding method, sheet-shaped melted resin that has been extruded from the openings of die is brought into close contact with a cooling drum. No particular limitation is imposed on the method for bringing the melted resin into close contact with the cooling drum. Examples thereof may include an air knife procedure, a vacuum box procedure, and an electrostatic adhesion procedure.

No particular limitation is imposed on the number of the cooling drum. Usually, the number of the cooling drum is two or more. No particular limitation is imposed on the method of arranging the cooling drums. Examples thereof may include a straight form, a Z form and an L form. No particular limitation is imposed on the manner of passing the melted resin extruded from the opening of the die to the cooling drum.

The degree of contact of the extruded sheet-shaped resin with the cooling drum changes depending on the temperature of the cooling drum. When the temperature of the cooling drum is increased, high level of close contact can be achieved. However, when the temperature is excessively increased, the sheet-shaped resin may not be separated from the cooling drum and may be wound around the drum. Therefore, the temperature of the cooling drum is set preferably to (Tg+30)° C. or lower and more preferably within the range of (Tg−5)° C. to (Tg−45)° C., where Tg is the glass transition temperature of a resin forming a layer that is extruded from a die and comes into contact with the drums. In this manner, problems such as slipping and flaw can be prevented.

[1-4. Stretching]

By stretching the pre-stretch film, the phase difference film layered body of the present invention is obtained. Since the P2 layer having high strength is disposed in contact with the P1 layer having relatively low strength, the overall strength of the pre-stretch film is high. Therefore, the pre-stretch film can be stretched without breakage by stretching. Since the P1 layer is protected by the P2 layer, bleedout of components of the P1 layer does not occur at the boundary between the P1 layer and the P2 layer. Therefore, the phase difference film layered body can be stably produced in-line, so that a long-length phase difference film layered body can be efficiently produced.

The stretching operation to be employed may be; a method in which uniaxial stretching is performed in the lengthwise direction by utilizing the difference in peripheral speed between rolls (longitudinal uniaxial stretching); a method in which uniaxial stretching is performed in the width direction using a tenter (crosswise uniaxial stretching); a method in which longitudinal uniaxial stretching and crosswise uniaxial stretching are performed sequentially (sequential biaxial stretching); or a method in which stretching is performed in a diagonal direction with respect to the lengthwise direction of the pre-stretch film (diagonal stretching). Particularly, diagonal stretching is preferably used because the diagonal stretching usually brings about generation of the slow axis in the diagonal direction in the P1 layer, which in turn can reduce waste upon cutting rectangular products out of the long-length phase difference film and can also realize efficient production of the phase difference film having a large surface area. The "diagonal direction" means a direction that is non-parallel, non-orthogonal direction.

Specific examples of the method for diagonal stretching may include a stretching method using a tenter stretching machine. Examples of the tenter stretching machine may include a tenter stretching machine that can apply feeding force, tensile force, or drawing force with different speeds to the left and right edges of the pre-stretch film (i.e., the left and right width-end edges of the pre-stretch film when the film conveyed horizontally is observed in the MD direction). Another example is a tenter stretching machine which can achieve diagonal stretching by applying feeding force, tensile force, or drawing force in the TD or MD direction with the same speed to the left and right edges, and by having non-linear left and right tracks with the same moving distance. Still another example is a tenter stretching machine in which the left and right edges are moved at different distances to achieve diagonal stretching.

When stretching is performed in a diagonal direction, it is preferable to perform stretching in such a direction that the angle of the stretching direction with respect to the lengthwise direction of the pre-stretch film is 40° or more and 50° or less. In this manner, a phase difference film having an orientation angle within the range of 40° or more and 50° or less with respect to the lengthwise direction can be obtained. The "orientation angle" is the angle between the lengthwise direction of the phase difference film and the in-plane slow axis of the phase difference film.

The film temperature during stretching is preferably Tg−20 to Tg+20° C., more preferably Tg−15 to Tg+2° C., and still more preferably Tg−13 to Tg−2° C., where Tg (° C.) is the glass transition temperature of the resin p1. The stretching ratio may be, e.g., 1.2 to 3 times.

The number of stretching operations may be one or may be two or more.

When a phase difference film layered body is produced from the pre-stretch film, a step other than those described above may be performed.

For example, the pre-stretch film may be subjected to pre-heat treatment before stretching. Examples of the means for pre-heating the pre-stretch film may include an oven-type heater, a radiation heater, and immersion into a liquid. Of these, an oven-type heater is preferable. The heating temperature in the pre-heating step is preferably equal to or higher than a temperature of stretching temperature−40° C. and more preferably equal to or higher than a temperature of the stretching temperature−30° C. and is preferably equal to or lower than a temperature of the stretching temperature+20° C. and more preferably equal to or lower than a temperature of the stretching temperature+15° C. The stretching temperature means the preset temperature of the heater.

For example, the obtained phase difference film layered body may be subjected to fixing treatment. The temperature in the fixing treatment is preferably equal to or higher than room temperature and more preferably equal to or higher than "the stretching temperature−40° C." and is preferably equal to or lower than "the stretching temperature+30° C." and more preferably equal to or lower than "the stretching temperature+20° C.".

If necessary, other films such as a mat layer, a hard-coat layer, an anti-reflection layer, an antifouling layer, etc. may be laminated, in order to protect the phase difference film layered body and to improve its handleability.

[1-5. Physical Properties Etc. of Phase Difference Film Layered Body]

The phase difference film layered body is produced by stretching the pre-stretch film including the P1 and P2 layers and therefore includes the stretched P1 layer and the stretched P2 layer (in the following description, the P1 and P2 layers before stretching and the P1 and P2 layers after stretching may simply be referred to as P1 and P2 layers when it is obvious from the context). P1 layer expresses a retardation as a result of stretching. Usually, the retardation expressed in the P1 layer has inverse wavelength distribution property.

The mechanism of the expression of inverse wavelength distribution property is deduced to be as follows.

Usually, in the visible wavelength range of 400 nm to 700 nm, the wavelength distribution properties of the polyphenylene ether having a positive intrinsic birefringence value are higher than the wavelength distribution properties of the polystyrene-based polymer having a negative intrinsic birefringence value. Further, the formulation and other factors of the resin p1 is adjusted such that the influence by the orientation of the polystyrene-based polymer is slightly larger than the influence by the orientation of the polyphenylene ether on the short-wavelength side and such that the influence by the orientation of the polystyrene-based polymer appears more remarkably as the wavelength approaches to the long-wavelength side.

The retardation expressed after the pre-stretch film is stretched is usually the sum of the retardation expressed by the orientation of the polyphenylene ether and the retardation expressed by the orientation of the polystyrene-based polymer. Therefore, when adjustment is effected such that the influence of the polystyrene-based polymer appears more remarkably as the wavelength approaches to the long-wavelength side as described above, inverse wavelength distribution property can be developed in the P1 layer.

Since a retardation with inverse wavelength distribution property is expressed in the P1 layer, the relationship of $Re_{450} < Re_{550} < Re_{650}$ is usually satisfied in a layer portion of the phase difference film layered body excluding the P2 layer. In the layer portion of the phase difference film layered body excluding the P2 layer, $Re_{450}$ represents an in-plane direction retardation of light having a wavelength of 450 nm, $Re_{550}$ represents an in-plane direction retardation of light having a wavelength of 550 nm, and $Re_{650}$ represents an in-plane direction retardation of light having a wavelength of 650 nm. Usually, a phase difference film having inverse wavelength distribution property can thereby be produced.

In the layer portion of the phase difference film layered body excluding the P2 layer, the in-plane direction retardation at a measurement wavelength of 550 nm is preferably 110 nm or more and 150 nm or less. In this manner, the phase difference film according to the present invention can function as a ¼ wave plate and can be applied to, e.g., a circularly polarizing plate.

Usually, in the phase difference film layered body, a retardation is expressed also in the P2 layer. However, since the P2 layer is removed before the phase difference film is used, the retardation of the P2 layer does not affect the retardation of the phase difference film according to the present invention. Therefore, in the phase difference film layered body, the configuration of the P2 layer may be freely set without being limited by the retardation of the P2 layer, and the thickness of the P2 layer may therefore be increased to increase the strength of the phase difference film layered body. Since the P2 layer is removed before use as described above, a reduction in thickness of the phase difference film is not hindered by the increased thickness of the P2 layer. Usually, the thickness of the P2 layer in the phase difference film layered body is preferably 50 μm or more, more preferably 100 μm or more, and still more preferably 150 μm or more and is preferably 300 μm or less, more preferably 250 μm or less, and still more preferably 200 μm or less.

[2. Phase Difference Film]

By removing the P2 layer from the phase difference film layered body, a phase difference film is obtained. Since the affinity between the resin p1 forming the P1 layer and the resin p2 forming the P2 layer is low, the P2 layer is easily removed from the P1 layer. By utilizing such property, a thin phase difference film including the P1 layer can be stably produced.

Since the phase difference film includes the P1 layer, the retardation of the phase difference film usually has inverse wavelength distribution property. The specific range of the retardation of the phase difference film is usually the same as the aforementioned range of the retardation of the layer portion of the phase difference film layered body excluding the P2 layer.

Since the thus-produced phase difference film does not have to include the P2 layer, the thickness of the phase difference film can be reduced. The specific thickness range may be set in accordance with the retardation value required for the phase difference film and is preferably 400 μm or less, more preferably 350 μm or less, and still more preferably 300 μm or less. No particular limitation is imposed on the lower limit, but the lower limit is usually 25 μm or more.

From the viewpoint of stably providing the functions as an optical member, the phase difference film has a total light transmittance of preferably 85% or more. The light transmittance may be measured using a spectrophotometer (ultraviolet-visible-near-infrared spectrophotometer "V 570", manufactured by JACSO Corporation) in accordance with JIS K0115.

The haze of the phase difference film is preferably 1% or less, more preferably 0.8% or less, and particularly preferably 0.5% or less. When the haze value is small, the clarity of an image displayed on a display device in which the phase difference film is installed can be increased. The haze is an average value of measurements at five points obtained using a "turbidimeter NDH-300A" manufactured by NIPPON DENSHOKU INDUSTRIES Co., Ltd. in accordance with JIS K7361-1997.

The phase difference film has a ΔYI of preferably 5 or less and more preferably 3 or less. When the ΔYI is within the aforementioned range, good visibility without coloring can be achieved. The ΔYI is measured using a "spectral color-difference meter SE2000" manufactured by NIPPON DENSHOKU INDUSTRIES Co., Ltd. in accordance with ASTM E313. The measurement is repeated five times, and the arithmetic average of the measurements is determined.

In the phase difference film, thickness variation of the P1 layer over its entire surface are preferably 1 μm or less. This can reduce unevenness in the color tone of a display device having the phase difference film. In addition, changes in the color tone after long-term use can be made uniform. To achieve this, the pre-stretch film may be formed such that thickness variation of the P1 layer over its entire surface are 1 μm or less.

The phase difference film may be on that shrinks in its lengthwise and width directions by heat treatment at 60° C. and 90% RH for 100 hours, but the shrinkage ratio is preferably 0.5% or less and more preferably 0.3% or less. When the phase difference film has such a small shrinkage ratio, the phase difference film can be prevented from being deformed by shrinkage stress and from coming off the display device even in a high-temperature and high-humidity environment.

The size of the phase difference film in its width direction may be, e.g., 1,000 mm to 2,000 mm. No limitation is imposed on the size of the phase difference film in its lengthwise direction, but the phase difference film is preferably a long-length film.

When the phase difference film is a long-length film, it is preferable that the phase difference film has an orientation angle within the range of 40° or more and 50° or less with respect to the lengthwise direction. When the phase difference film is formed into a rectangular film piece, the product is often required to have a slow axis in the diagonal direction with respect to the directions of the edges of the rectangular shape. In such a case, when the orientation angle is within the range of 40° or more and 50° or less with respect to the lengthwise direction, the rectangular film product can be cut out from the long-length phase difference film simply by cutting out the rectangular film piece with its edges being in the direction parallel to or orthogonal to the lengthwise direction, whereby efficient production can be performed and area size can be easily enlarged.

The phase difference film may include an optional layer in addition to the P1 layer, so long as the effects of the invention are not significantly impaired.

For example, the phase difference film may further include, on its surface, a mat layer for improving the slidability of the phase difference film, a hard-coat layer, an anti-reflection layer, an anti-fouling layer.

[3. Applications]

The phase difference film according to the present invention can provide compensation of birefringence at a high level and may be used alone or in combination with other members. The phase difference film may be applied to, e.g., liquid crystal display devices, organic electroluminescent display devices, plasma display devices, FED (field emission display) devices, and SED (surface field emission display) devices.

Usually, a liquid crystal display device includes: a liquid crystal panel in which a light source-side polarizing plate, a liquid crystal cell, and a visual recognition-side polarizing plate are disposed in that order; and a light source for irradiating the liquid crystal panel with light. The visibility of the liquid crystal display device can be significantly improved by disposing the phase difference film, e.g., between the liquid crystal cell and the light source-side polarizing plate or between the liquid crystal cell and the visual recognition-side polarizing plate.

Examples of the driving mode of the liquid crystal cell may include an in-plane switching (IPS) mode, a vertical alignment (VA) mode, a multi-domain vertical alignment (MVA) mode, a continuous pinwheel alignment (CPA) mode, a hybrid alignment nematic (HAN) mode, a twisted nematic (TN) mode, a super twisted nematic (STN) mode, and an optical compensated bend (OCB) mode.

In the liquid crystal display device, the phase difference film may be laminated onto the liquid crystal cell or a polarizing plate. The phase difference film may be laminated onto each of the two polarizing plates. Two or more phase difference films may be used. An adhesive may be used for lamination.

Each of the polarizing plates for use may include, e.g., a polarizer and protective films laminated onto both sides thereof. In place of the protective films, the phase difference films may be laminated directly onto the polarizer and used as layers having both functions of an optical compensation film and a protective film. In this configuration, the protective films are omitted. This can contribute to a reduction in thickness, weight, and cost of the liquid crystal display device.

Further, the phase difference film may be combined with, e.g., a circularly polarizing film to form a brightness enhancement film, and this brightness enhancement film may be provided in a liquid crystal display device.

EXAMPLES

The present invention will be specifically described hereinbelow by way of Examples. However, the present invention is not limited to the following Examples. The present invention may be implemented with any modifications without departing from the scope of the claims and equivalents thereto.

Unless otherwise specified, "%" and "part" in the following description representing an amount are based on weight.

Unless otherwise specified, the procedures described hereinbelow were performed under the conditions of normal temperature and normal pressure.

[Description of Evaluation Methods]

(Method for Measuring Weight Average Molecular Weight Mw)

Measurement was performed at 135° C. by gel permeation chromatography using 1,2,4-trichlorobenzene as a solvent to determine the weight average molecular weight (Mw) in terms of standard polystyrene.

(Method for Measuring Glass Transition Temperature Tg)

The glass transition temperature Tg of the resin p1 was measured by a differential scanning calorimeter ("EXSTAR6220" manufactured by Seiko Instruments Inc.) with temperature elevation at 20° C./min.

(Method for Evaluating Ease of Kneading)

Pellets of the resin p1 were produced using a biaxial kneader, and the glass transition temperatures of the pellets generated at the initial, intermediate, and late stages of extrusion were measured. When the difference between the measured glass transition temperatures was less than 3° C., the pallets were considered to be easily kneadable and evaluated as "good". When the difference was 3° C. or higher, the pallets were considered to be not easily kneadable and evaluated as "poor".

(Rupture Energy of Film of Resin p1)

The pellets of the resin p1 were subjected to melt extrusion molding to produce a film having a thickness of 100 μm. A ball having a weight of 0.0055 kg was dropped from a certain height onto the film. From the height when the film was ruptured (rupture height), the rupture energy was calculated in accordance with the following formula.

Rupture energy (mJ)=ball weight (kg)×rupture height (cm)×9.8

Whether or not the film was ruptured was determined by visually observing the film to check whether or not the film was deformed by the dropped ball.

(Method for Evaluating Heterogeneous Objects During Film Formation)

The formed pre-stretch film was observed to check whether or not heterogeneous objects with a size of 0.8 $mm^2$ or more were present. When heterogeneous objects were present on the surface of the pre-stretch film at a ratio of 0.1 objects/$m^2$ or more, the pre-stretch film was evaluated as "poor". When the ratio was less than 0.1 objects/$m^2$, the pre-stretch film was evaluated as "good".

(Thickness Measurement for Each Layer in Film)

The pellets of the resin p1 were subjected to melt extrusion molding to produce a film, and the average refractive index of the resin p1 was measured. Separately, pellets of a resin containing an acrylic resin or an alicyclic structure-containing polymer were subjected to melt extrusion molding to produce a film, and the average refractive index of the resin containing an acrylic resin or an alicyclic structure-containing polymer was measured. These average refractive indices were measured using a refractive index-thickness measuring device ("Prism Coupler" manufactured by Metricon Corporation) at a measurement wavelength of 532 nm.

The obtained average refractive index values of the resin p1 and the resin containing an acrylic resin or an alicyclic structure-containing polymer were input, as the average refractive indices of the P1 and P2 layers, to a high-speed multi-layer thickness meter ("StraDex f" manufactured by ISIS sentronics GmbH). On the basis of these values, the thickness of each layer in the pre-stretch film was measured.

(Method for Evaluating Ease of Removing P2 Layers)

The ease of removing the P2 layers from the phase difference film layered body was evaluated on the basis of whether or not the P2 layers were easily peeled off by hand.

(Method for Measuring $Re_{450}$, $Re_{550}$, and $Re_{650}$)

An in-plane direction retardation $Re_{450}$ (unit: nm) at a measurement wavelength of 450 nm, an in-plane direction retardation $Re_{550}$ (unit: nm) at a measurement wavelength of 550 nm, and an in-plane direction retardation $Re_{650}$ (unit: nm) at a measurement wavelength of 650 nm were measured at 10 random points on a film using "AxoScan" manufactured by AXOMETRICS, and the average values were calculated.

Example 1

Production and Evaluation of Resin p1

64 Parts by weight of syndiotactic polystyrene ("XAREC 130ZC" manufactured by Idemitsu Kosan Co., Ltd., Mw: 180,000) and 36 parts by weight of polyphenylene ether ("PPO640" manufactured by SABIC Innovative Plastics Japan, Mw: 43,000) were kneaded in a twin screw extruder at 290° C. to produce pellets of transparent resin p1.

The ease of kneading of the obtained resin p1 was evaluated. The results are shown in Table 1.

The glass transition temperature of the resin p1 was measured and found to be 127° C.

The pellets of the resin p1 were subjected to melt extrusion molding to produce a film having a thickness of 100 μm. The rupture energy of the film was measured and found to be 24 mJ.

(Production and Evaluation of Pre-Stretch Film)

In order to produce a two-type three-layer film by co-extrusion molding separately from the film for measurement of rupture energy, a film forming apparatus (an apparatus of the type in which two types of resins were used to form a film including three layers) was prepared. This film forming apparatus includes a plurality of single screw extruders each provided with a double-flight type screw.

Pellets of an acrylic resin ("HT55Z" manufactured by Sumitomo Chemical Co., Ltd., glass transition temperature: 108° C.) containing an acrylic polymer and rubber particles were fed to one of the single screw extruders of the film forming apparatus, and melted.

The pellets of the resin p1 were fed to another one of the single screw extruders of the film forming apparatus, and melted.

The melted acrylic resin was passed through a polymer filter having a leaf disc shape and an opening of 10 μm, and supplied to one of manifolds of a multi-manifold die (surface roughness of a die lip: Ra=0.1 μm) of the film forming apparatus.

The melted resin p1 was passed through a polymer filter having a leaf disc shape and an opening of 10 μm, and supplied to another one of the manifolds of the film forming apparatus.

The acrylic resin and the resin p1 were simultaneously extruded from the multi-manifold die at 260° C. while the extrusion conditions were controlled so that resin layers with desired thicknesses were obtained, whereby the resins were formed into a film shape having a three-layer structure consisting of (an acrylic resin layer)/(a resin p1 layer)/(an acrylic resin layer). The melted resins thus co-extruded into a film shape were casted onto a cooling roller having a surface temperature adjusted to 115° C. and then passed between two cooling rollers having a surface temperature adjusted to 120° C. In this manner, a pre-stretch film having a three-layer structure including an acrylic resin layer (P2 layer), a resin p1 layer (P1 layer), and an acrylic resin layer (P2 layer) in this order was obtained (a co-extrusion step).

As to this pre-stretch film, evaluation for heterogeneous objects and measurement for thickness were performed. The results are shown in Table 1.

(Production and Evaluation of Phase Difference Film Layered Body)

Subsequently, the pre-stretch film was diagonally stretched using a tenter stretching machine such that the slow axis was inclined at an angle of 50° with respect to the MD direction. The temperature during stretching was 129° C., the stretching time was 2 minutes, and the stretching ratio was 1.5 times. A long-length phase difference film layered body having a thickness of 140 μm was thereby obtained.

(Production and Evaluation of Phase Difference Film)

The P2 layers were removed from the obtained phase difference film layered body by hand to thereby obtain a phase difference film consisting of only the P1 layer.

Since the P2 layers were easily peeled off by hand, the ease of removing was good.

The orientation of the phase difference film was checked, and the slow axis was found to be inclined at an angle of 50° with respect to the MD direction.

The thickness of the obtained phase difference film was measured, and the in-plane direction retardations $Re_{450}$, $Re_{550}$, and $Re_{650}$ were measured in the aforementioned manner. The results are shown in Table 1.

Example 2

Pellets of transparent resin p1 were produced in the same manner as in the production of the resin p1 in Example 1 except that the amount of the syndiotactic polystyrene was changed to 62.5 parts by weight and the amount of the polyphenylene ether was changed to 37.5 parts by weight.

The ease of kneading of the obtained resin p1 was evaluated. The results are shown in Table 1.

The glass transition temperature of the resin p1 was measured and found to be 130° C.

Using the resin p1, a film having a thickness of 100 was produced in the same manner as in Example 1. The rupture energy of this film was measured and found to be 25 mJ.

A pre-stretch film having a three-layer structure including an acrylic resin layer (P2 layer), a resin p1 layer (P1 layer), and an acrylic resin layer (P2 layer) in this order was obtained and evaluated in the same manner as in the production and evaluation of the pre-stretch film in Example 1 except that the resin p1 prepared in the aforementioned manner in this Example 2 was used in place of the resin p1 prepared in Example 1 and that the extrusion conditions were appropriately adjusted so that desired thicknesses were obtained. The results are shown in Table 1.

Subsequently, a long-length phase difference film layered body having a thickness of 200 µm was produced in the same manner as in the production of the phase difference film layered body in Example 1 except that the pre-stretch film prepared in the aforementioned manner in this Example 2 was used in place of the pre-stretch film prepared in Example 1, that the stretching temperature was changed to 132° C., and that stretching was performed such that the slow axis was inclined at an angle of 45° with respect to the MD direction.

The P2 layers were removed from the obtained phase difference film layered body by hand to thereby obtain a phase difference film consisting of only the P1 layer. Since the P2 layers were easily peeled off by hand, the ease of removing was good.

The orientation of the phase difference film was checked, and the slow axis was found to be inclined at an angle of 45° with respect to the MD direction.

The thickness of the obtained phase difference film was measured, and the in-plane direction retardations $Re_{450}$, $Re_{550}$, and $Re_{650}$ were measured in the aforementioned manner. The results are shown in Table 1.

Example 3

Pellets of transparent resin p1 were produced in the same manner as in the production of the resin p1 in Example 1 except that the amount of the syndiotactic polystyrene was changed to 60 parts by weight and the amount of the polyphenylene ether was changed to 40 parts by weight.

The ease of kneading of the obtained resin p1 was evaluated. The results are shown in Table 1.

The glass transition temperature of the resin p1 was measured and found to be 133° C.

Using the resin p1, a film having a thickness of 100 was produced in the same manner as in Example 1. The rupture energy of this film was measured and found to be 26 mJ.

A pre-stretch film having a three-layer structure including an acrylic resin layer (P2 layer), a resin p1 layer (P1 layer), and an acrylic resin layer (P2 layer) in this order was obtained and evaluated in the same manner as in the production and evaluation of the pre-stretch film in Example 1 except that the resin p1 prepared in the aforementioned manner in this Example 3 was used in place of the resin p1 prepared in Example 1 and that the extrusion conditions were appropriately adjusted so that desired thicknesses were obtained. The results are shown in Table 1.

Subsequently, a long-length phase difference film layered body having a thickness of 112 µm was produced in the same manner as in the production of the phase difference film layered body in Example 1 except that the pre-stretch film prepared in the aforementioned manner in this Example 3 was used in place of the pre-stretch film prepared in Example 1, that the stretching temperature was changed to 130° C., that the stretching ratio was changed to 2.6 times, and that stretching was performed such that the slow axis was inclined at an angle of 45° with respect to the MD direction.

The P2 layers were removed from the obtained phase difference film layered body by hand to thereby obtain a phase difference film consisting of only the P1 layer. Since the P2 layers were easily peeled off by hand, the ease of removing was good.

The orientation of the phase difference film was checked, and the slow axis was found to be inclined at an angle of 45° with respect to the MD direction.

The thickness of the obtained phase difference film was measured, and the in-plane direction retardations $Re_{450}$, $Re_{550}$, and $Re_{650}$ were measured in the aforementioned manner. The results are shown in Table 1.

Example 4

A pre-stretch film having a three-layer structure including an acrylic resin layer (P2 layer), a resin p1 layer (P1 layer), and an acrylic resin layer (P2 layer) in this order was obtained and evaluated in the same manner as in the production and evaluation of the pre-stretch film in Example 1 except that the resin p1 prepared in Example 3 was used in place of the resin p1 prepared in Example 1 and that the extrusion conditions were appropriately adjusted so that desired thicknesses were obtained. The results are shown in Table 1.

Subsequently, a long-length phase difference film layered body having a thickness of 66 µm was produced in the same manner as in the production of the phase difference film layered body in Example 1 except that the pre-stretch film prepared in the aforementioned manner in this Example 4 was used in place of the pre-stretch film prepared in Example 1, that the stretching temperature was changed to 131° C., that the stretching ratio was changed to 2.8 times, and that stretching was performed such that the slow axis was inclined at an angle of 40° with respect to the MD direction.

The P2 layers were removed from the obtained phase difference film layered body by hand to thereby obtain a phase difference film consisting of only the P1 layer. Since the P2 layers were easily peeled off by hand, the ease of removing was good.

The orientation of the phase difference film was checked, and the slow axis was found to be inclined at an angle of 40° with respect to the MD direction.

The thickness of the obtained phase difference film was measured, and the in-plane direction retardations $Re_{450}$, $Re_{550}$, and $Re_{650}$ were measured in the aforementioned manner. The results are shown in Table 1.

Example 5

Pellets of transparent resin p1 were produced in the same manner as in the production of the resin p1 in Example 1 except that the amount of the syndiotactic polystyrene was changed to 57.5 parts by weight and the amount of the polyphenylene ether was changed to 42.5 parts by weight.

The ease of kneading of the obtained resin p1 was evaluated. The results are shown in Table 2.

The glass transition temperature of the resin p1 was measured and found to be 135° C.

Using the resin p1, a film having a thickness of 100 μm was produced in the same manner as in Example 1. The rupture energy of this film was measured and found to be 27 mJ.

A pre-stretch film having a three-layer structure including a resin layer containing an alicyclic structure-containing polymer (P2 layer), a resin p1 layer (P1 layer), and a resin layer containing the alicyclic structure-containing polymer (P2 layer) in this order was obtained and evaluated in the same manner as in the production and evaluation of the pre-stretch film in Example 1 except that the resin p1 prepared in the aforementioned manner in this Example 6 was used in place of the resin p1 prepared in Example 1, that pellets of a resin containing the alicyclic structure-containing polymer ("ZEONOR 1060" manufactured by ZEON CORPORATION, glass transition temperature: 100° C.) were used in place of the pellets of the acrylic resin, and that the extrusion conditions were appropriately adjusted so that desired thicknesses were obtained. The results are shown in Table 2.

Subsequently, a long-length phase difference film layered body having a thickness of 129 μm was produced in the same manner as in the production of the phase difference film layered body in Example 1 except that the pre-stretch film prepared in the aforementioned manner in this Example 5 was used in place of the pre-stretch film prepared in Example 1, that the stretching temperature was changed to 124° C., that the stretching ratio was changed to 3.0 times, and that stretching was performed such that the slow axis was inclined at an angle of 40° with respect to the MD direction.

The P2 layers were removed from the obtained phase difference film layered body by hand to thereby obtain a phase difference film consisting of only the P1 layer. Since the P2 layers were easily peeled off by hand, the ease of removing was good.

The orientation of the phase difference film was checked, and the slow axis was found to be inclined at an angle of 40° with respect to the MD direction.

The thickness of the obtained phase difference film was measured, and the in-plane direction retardations $Re_{450}$, $Re_{550}$, and $Re_{650}$ were measured in the aforementioned manner. The results are shown in Table 2.

Comparative Example 1

Pellets of resin p1 were produced in the same manner as in the production of the resin p1 in Example 3 except that amorphous polystyrene ("HH102" manufactured by PS Japan Corporation, Mw: 250,000) was used in place of the syndiotactic polystyrene. Many heterogeneous objects were found in the resin p1.

The ease of kneading of the obtained resin p1 was evaluated. The results are shown in Table 2.

The glass transition temperature of the resin p1 was measured and found to be 135° C.

Using the resin p1, a film having a thickness of 100 μm was produced in the same manner as in Example 1. The rupture energy of this film was measured and found to be 7 mJ.

Separately from the film for measurement of rupture energy, a pre-stretch film was obtained by melting the pellets of the resin p1 prepared in the aforementioned manner in this Comparative Example 1 in a single screw extruder, and supplying the melted resin to a die for extrusion to perform extrusion molding. As to this pre-stretch film, evaluation for heterogeneous objects and measurement for thickness were performed. The results are shown in Table 2.

Subsequently, a long-length phase difference film having a thickness of 80 μm was produced in the same manner as in the production of the phase difference film layered body in Example 1 except that the pre-stretch film prepared in the aforementioned manner in this Comparative Example 1 was used in place of the pre-stretch film prepared in Example 1, that the stretching temperature was changed to 155° C., that the stretching ratio was changed to 3.0 times, and that stretching was performed such that the slow axis was inclined at an angle of 40° with respect to the MD direction.

The orientation of the phase difference film was checked, and the slow axis was found to be inclined at an angle of 40° with respect to the MD direction.

The in-plane direction retardations $Re_{450}$, $Re_{550}$, and $Re_{650}$ of the obtained phase difference film were measured in the aforementioned manner. The results are shown in Table 2.

Comparative Example 2

Pellets of transparent resin p1 were produced in the same manner as in the production of the resin p1 in Example 1 except that the amount of the syndiotactic polystyrene was changed to 70 parts by weight and the amount of the polyphenylene ether was changed to 30 parts by weight.

The ease of kneading of the obtained resin p1 was evaluated. The results are shown in Table 3.

The glass transition temperature of the resin p1 was measured. The glass transition temperature values measured at the initial stage, the intermediate stage, and the final stage of kneading were different from each other, but the average was 122° C.

Using the resin p1, a film having a thickness of 100 μm was produced in the same manner as in Example 1. The rupture energy of this film was measured and found to be 21 mJ.

A pre-stretch film having a three-layer structure including an acrylic resin layer (P2 layer), a resin p1 layer (P1 layer), and an acrylic resin layer (P2 layer) in this order was obtained and evaluated in the same manner as in the production and evaluation of the pre-stretch film in Example 1 except that the resin p1 prepared in the aforementioned manner in this Comparative Example 2 was used in place of the resin p1 prepared in Example 1 and that the extrusion conditions were appropriately adjusted so that desired thicknesses were obtained. The results are shown in Table 3.

Subsequently, a long-length phase difference film layered body having a thickness of 175 μm was obtained in the same manner as in the production of the phase difference film layered body in Example 1 except that the pre-stretch film prepared in the aforementioned manner in this Comparative Example 2 was used in place of the pre-stretch film prepared in Example 1, that the stretching temperature was changed to 137° C., that the stretching ratio was changed to 2.0 times, and that stretching was performed such that the slow axis was inclined at an angle of 40° with respect to the MD direction.

The P2 layers were removed from the obtained phase difference film layered body by hand to thereby obtain a phase difference film consisting of only the P1 layer. Since the P2 layers were easily peeled off by hand, the ease of removing was good.

The orientation of the phase difference film was checked, and the slow axis was found to be inclined at an angle of 40° with respect to the MD direction.

The thickness of the obtained phase difference film was measured, and the in-plane direction retardations $Re_{450}$, $Re_{550}$, and $Re_{650}$ were measured in the aforementioned manner. As the resin was kneaded insufficiently, variation in retardation at different measurement points were as large as 10 nm or more. The results are shown in Table 3.

Comparative Example 3

Pellets of transparent resin p1 were produced in the same manner as in the production of the resin p1 in Example 1 except that the amount of the syndiotactic polystyrene was changed to 45 parts by weight and the amount of the polyphenylene ether was changed to 55 parts by weight.

The ease of kneading of the obtained resin p1 was evaluated. The results are shown in Table 3.

The glass transition temperature of the resin p1 was measured and found to be 149° C.

Using the resin p1, a film having a thickness of 100 μm was produced in the same manner as in Example 1. The rupture energy of this film was measured and found to be 34 mJ.

A pre-stretch film having a three-layer structure including an acrylic resin layer (P2 layer), a resin p1 layer, and an acrylic resin layer (P2 layer) in this order was obtained and evaluated in the same manner as in the production and evaluation of the pre-stretch film in Example 1 except that the resin p1 prepared in the aforementioned manner in this Comparative Example 3 was used in place of the resin p1 prepared in Example 1 and that the extrusion conditions were appropriately adjusted so that desired thicknesses were obtained. The results are shown in Table 3.

Subsequently, a long-length phase difference film layered body having a thickness of 116 μm was obtained in the same manner as in the production of the phase difference film layered body in Example 1 except that the pre-stretch film prepared in the aforementioned manner in this Comparative Example 3 was used in place of the pre-stretch film prepared in Example 1, that the stretching temperature was changed to 137° C., that the stretching ratio was changed to 3.0 times, and that stretching was performed such that the slow axis was inclined at an angle of 40° with respect to the MD direction.

The P2 layers were removed from the obtained phase difference film layered body by hand to thereby obtain a phase difference film consisting of only the P1 layer. Since the P2 layers were easily peeled off by hand, the ease of removing was good.

The orientation of the phase difference film was checked, and the slow axis was found to be inclined at an angle of 40° with respect to the MD direction.

The thickness of the obtained phase difference film was measured, and the in-plane direction retardations $Re_{450}$, $Re_{550}$, and $Re_{650}$ were measured in the aforementioned manner. The results are shown in Table 3.

Comparative Example 4

A glass container having a volume of 500 mL and inner air of which had been replaced with argon was charged with 17.8 g (71 mmol) of copper sulfate pentahydrate ($CuSO_4 \cdot 5H_2O$), 200 mL of toluene, and 24 mL (250 mmol) of trimethylaluminum, and the mixture was allowed to react at 40° C. for 8 hours. Then solids were removed to obtain a solution, and toluene was evaporated from the solution at room temperature under reduced pressure to thereby obtain 6.7 g of a contact product. The molecular weight of the contact product was measured by a cryoscopic method and found to be 610.

Subsequently, a reaction container was charged with 5 mmol of the contact product in terms of the amount of aluminum atoms, 5 mmol of triisobutylaluminum, 0.025 mmol of pentamethylcyclopentadienyl titanium trimethoxide, and 1 mmol of purified styrene, and a polymerization reaction was performed at 90° C. for 5 hours. Then the catalyst component was decomposed using a methanol solution of sodium hydroxide, and the product was repeatedly washed with methanol and then dried to obtain 308 g of a polymer (polystyrene).

Then the weight average molecular weight of the polymer was measured at 135° C. by gel permeation chromatography using 1,2,4-trichlorobenzene as a solvent. As a result, it was found that the weight average molecular weight of the polymer was 350,000. Melting point measurement and $^{13}C$-NMR measurement were also performed, to thereby confirm that the obtained polymer was a polystyrene polymer having a syndiotactic structure.

Pellets of resin p1 were produced in the same manner as in the production of the resin p1 in Example 1 except that 75 parts by weight of the syndiotactic polystyrene prepared in Comparative Example 4 was used in place of the syndiotactic polystyrene "XAREC 130ZC" and that the amount of the polyphenylene ether was changed to 25 parts by weight. Many heterogeneous objects were found in the resin p1.

The ease of kneading of the obtained resin p1 was evaluated. The results are shown in Table 3.

Using the resin p1, a film having a thickness of 100 μm was produced in the same manner as in Example 1. The rupture energy of this film was measured and found to be 8 mJ.

A pre-stretch film having a thickness of 247 μm was obtained and evaluated in the same manner as in the production and evaluation of the pre-stretch film in Comparative Example 1 except that the resin p1 prepared in the aforementioned manner in this Comparative Example 4 was used in place of the resin p1 prepared in Comparative Example 1 and that the extrusion conditions were appropriately adjusted so that desired thicknesses were obtained. The results are shown in Table 3.

Subsequently, a long-length phase difference film having a thickness of 82 μm was produced in the same manner as in the production of the phase difference film layered body in Example 1 except that the pre-stretch film prepared in the aforementioned manner in this Comparative Example 4 was used in place of the pre-stretch film prepared in Example 1, that the stretching temperature was changed to a temperature higher by 13° C. than the glass transition temperature of the resin p1, that the stretching ratio was changed to 3.0 times, and that stretching was performed such that the slow axis was inclined at an angle of 40° with respect to the MD direction.

The orientation of the phase difference film was checked, and the slow axis was found to be inclined at an angle of 40° with respect to the MD direction.

The in-plane direction retardations $Re_{450}$, $Re_{550}$, and $Re_{650}$ of the obtained phase difference film were measured in the aforementioned manner. The results are shown in Table 3.

Comparative Example 5

An attempt was made to produce a phase difference film using the pre-stretch film obtained in Comparative Example 4 in the same manner as in Comparative Example 4 except that the stretching ratio was changed. However, the film was ruptured when the stretching ratio was set to be 3.2 times.

[Results]

The results in Examples and Comparative Examples will be shown in the following Tables 1 to 3. In the following tables, "PPE" represents polyphenylene ether, "SPS" represents polystyrene having a syndiotactic structure, "PS" represents polystyrene (having no syndiotactic structure), and "HT55Z" represents an acrylic resin (HT55Z).

TABLE 1

[Results of Examples 1 to 4]

| | | Example 1 | Example 2 | Example 3 | Example 4 |
|---|---|---|---|---|---|
| Polyphenylene ether | Type | PPE | PPE | PPE | PPE |
| | Weight average molecular weight | 43,000 | 43,000 | 43,000 | 43,000 |
| | Ratio (part) | 36 | 37.5 | 40 | 40 |
| Polystyrene-based polymer | Type | SPS | SPS | SPS | SPS |
| | Weight average molecular weight | 180,000 | 180,000 | 180,000 | 180,000 |
| | Ratio (part) | 64 | 62.5 | 60 | 60 |
| Resin p1 | Tg (° C.) of resin p1 | 127 | 130 | 133 | 133 |
| | Ease of kneading of resin p1 | good | good | good | good |
| | Rupture energy of a film consisting of resin p1 (mJ) | 24 | 25 | 26 | 26 |
| Pre-stretch film | Heterogeneous objects during film formation of pre-stretch film | good | good | good | good |
| | Resin p2 | HT55Z | HT55Z | HT55Z | HT55Z |
| | Total film thickness (μm) | 210 | 300 | 291 | 183 |
| | Thickness of one of P2 layers | 70 | 100 | 100 | 53 |
| | Thickness of another one of P2 layers | 70 | 100 | 100 | 53 |
| Stretching conditions | Stretching temperature (° C.) | 129 | 132 | 130 | 131 |
| | Diagonal stretching ratio (stretching time: 5 min) | 1.5 times | 1.5 times | 2.6 times | 2.8 times |
| Phase difference film layered body | Film thickness of phase difference film layered body (μm) | 140 | 200 | 112 | 66 |
| | Ease of removing P2 layers | good | good | good | good |
| Phase difference film | Thickness of phase difference film after removing P2 layer (μm) | 47 | 67 | 35 | 28 |
| | Re450 (nm) | 133 | 129 | 121 | 119 |
| | Re550 (nm) | 136 | 138 | 137 | 137 |
| | Re650 (nm) | 137 | 144 | 143 | 143 |
| | Orientation angle (°) | 50 | 45 | 45 | 40 |

TABLE 2

[Results of Example 5 and Comparative Example 1]

| | | Example 5 | Comparative Example 1 |
|---|---|---|---|
| Polyphenylene ether | Type | PPE | PPE |
| | Weight average molecular weight | 43,000 | 43,000 |
| | Ratio (part) | 42.5 | 40 |
| Polystyrene-based polymer | Type | SPS | PS |
| | Weight average molecular weight | 180,000 | 250,000 |
| | Ratio (part) | 57.5 | 60 |
| Resin p1 | Tg (° C.) of resin p1 | 135 | 135 |
| | Ease of kneading of resin p1 | good | good |
| | Rupture energy of a film consisting of resin p1 (mJ) | 27 | 7 |
| Pre-stretch film | Heterogeneous objects during film formation of pre-stretch film | good | poor |
| | Resin p2 | ZEONOR1060 | — |
| | Total film thickness (μm) | 386 | 240 |
| | Thickness of one of P2 layers | 151 | — |
| | Thickness of another one of P2 layers | 151 | — |

TABLE 2-continued

[Results of Example 5 and Comparative Example 1]

| | | Example 5 | Comparative Example 1 |
|---|---|---|---|
| Stretching conditions | Stretching temperature (° C.) | 124 | 155 |
| | Diagonal stretching ratio (stretching time: 5 min) | 3.0 times | 3.0 times |
| Phase difference film layered body | Film thickness of phase difference film layered body (μm) | 129 | — |
| | Ease of removing P2 layers | good | — |
| Phase difference film | Thickness of phase difference film after removing P2 layer (μm) | 28 | 80 |
| | Re450 (nm) | 118 | 46 |
| | Re550 (nm) | 141 | 42 |
| | Re650 (nm) | 1478 | 41 |
| | Orientation angle (°) | 40 | 40 |

TABLE 3

[Results of Comparative Examples 2 to 5]

| | | Comp. Example 2 | Comp. Example 3 | Comp. Example 4 | Comp. Example 5 |
|---|---|---|---|---|---|
| Polyphenylene ether | Type | PPE | PPE | PPE | PPE |
| | Weight average molecular weight | 43,000 | 43,000 | 43,000 | 43,000 |
| | Ratio (part) | 30 | 55 | 25 | 25 |
| Polystyrene-based polymer | Type | SPS | SPS | SPS | SPS |
| | Weight average molecular weight | 180,000 | 180,000 | 350,000 | 350,000 |
| | Ratio (part) | 70 | 45 | 75 | 75 |
| Resin p1 | Tg (° C.) of resin p1 | 122 | 149 | — | — |
| | Ease of kneading of resin p1 | poor | good | good | good |
| | Rupture energy of a film consisting of resin p1 (mJ) | 21 | 34 | 8 | 8 |
| Pre-stretch film | Heterogeneous objects during film formation of pre-stretch film | good | good | poor | poor |
| | Resin p2 | HT55Z | HT55Z | — | — |
| | Total film thickness (μm) | 350 | 348 | 247 | 247 |
| | Thickness of one of P2 layers | 140 | 139 | — | — |
| | Thickness of another one of P2 layers | 140 | 139 | — | — |
| Stretching conditions | Stretching temperature (° C.) | 137 | 137 | Tg + 13 | Tg + 13 |
| | Diagonal stretching ratio (stretching time: 5 min) | 2.0 times | 3.0 times | 3.0 times | 3.2 times |
| Phase difference Film layered body | Film thickness of phase difference film layered body (μm) | 175 | 116 | — | rupture |
| | Ease of removing P2 layers | good | good | — | rupture |
| Phase difference film | Thickness of phase difference film after removing P2 layer (μm) | 35 | 23 | 82 | rupture |
| | Re450 (nm) | 155 | 2 | 116 | — |
| | Re550 (nm) | 140 | 5 | 140 | — |
| | Re650 (nm) | 135 | 6 | 151 | — |
| | Orientation angle (°) | 40 | 40 | 40 | — |

As can be seen from the results shown in Tables 1 to 3, Examples 1 to 7 realized stable production of the phase difference films having inverse wavelength distribution property and having higher strength and quality than those in Comparative Examples 1 to 5 in which the requirements of the present invention are not met.

The invention claimed is:

1. A phase difference film layered body obtained by stretching a pre-stretch film, the pre-stretch film including: a P1 layer consisting of a resin p1 containing polyphenylene ether having a positive intrinsic birefringence value and a polystyrene-based polymer having a negative intrinsic birefringence value and having a syndiotactic structure; and a P2 layer disposed in contact with the P1 layer and consisting of a resin p2 containing an acrylic resin or an alicyclic structure-containing polymer, wherein
in the resin p1, a weight ratio of (a content of the polyphenylene ether)/(a content of the polystyrene-based polymer) is 35/65 to 45/55,
in a layer portion of the phase difference film layered body excluding the P2 layer, an in-plane direction retardation $Re_{450}$ of light having a wavelength of 450 nm, an in-plane direction retardation $Re_{550}$ of light having a wavelength of 550 nm, and an in-plane direction retardation $Re_{650}$ of light having a wavelength of 650 nm satisfy a relationship of $Re_{450}<Re_{550}<Re_{650}$,
a weight average molecular weight of the polyphenylene ether is 15,000 to 100,000, and a weight average molecular weight of the polystyrene-based polymer is 130,000 to 300,000.

2. The phase difference film layered body according to claim 1, wherein the phase difference film layered body is a long-length film and has a slow axis in a diagonal direction with respect to a lengthwise direction of the phase difference film layered body.

3. The phase difference film layered body according to claim 2, wherein the phase difference film layered body has the slow axis in a direction inclined at an angle of 40° or more and 50° or less with respect to the lengthwise direction.

4. A method for producing the phase difference film layered body according to claim 1, the method comprising the steps of:
  obtaining a pre-stretch film by co-extruding a resin p1 and a resin p2, the resin p1 containing polyphenylene ether having a positive intrinsic birefringence value and a polystyrene-based polymer having a negative intrinsic birefringence value and having a syndiotactic structure, a weight ratio of (a content of the polyphenylene ether)/(a content of the polystyrene-based polymer) being 35/65 to 45/55, the resin p2 containing an acrylic resin or an alicyclic structure-containing polymer; and stretching the pre-stretch film.

5. The method according to claim 4, wherein the stretching is performed at a film temperature of Tg −20° C. to Tg+20° C. where Tg is a glass transition temperature of the resin p1.

6. The method according to claim 4, wherein
  the pre-stretch film obtained in the step of obtaining the pre-stretch film is a long-length film, and
  in the stretching step, the pre-stretch film is stretched in a diagonal direction with respect to the lengthwise direction of the pre-stretch film.

7. The method according to claim 6, wherein, in the step of stretching, the pre-stretch film is stretched in a direction inclined at an angle of 40° or more and 50° or less with respect to the lengthwise direction of the pre-stretch film.

8. A method for producing a phase difference film, the method comprising removing the P2 layer from the phase difference film layered body according to claim 1.

9. The phase difference film layered body according to claim 1, wherein the polyphenylene ether is a polymer containing a phenylene ether unit represented by formula (I)

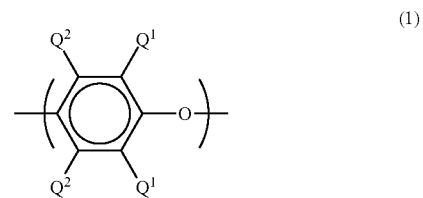

(1)

wherein each $Q^1$ independently represents a halogen atom, an alkyl group having 7 or less carbon atoms, a phenyl group, a haloalkyl group, an aminoalkyl group, a hydrocarbon oxy group, or a halohydrocarbon oxy group provided that a halogen atom and an oxygen atom are separated by at least two carbon atoms, and
each $Q^2$ independently represents a hydrogen atom, a halogen atom, an alkyl group having 7 or less carbon atoms, a phenyl group, a haloalkyl group, a hydrocarbon oxy group, or a halohydrocarbon oxy group provided that a halogen atom and an oxygen atom are separated by at least two carbon atoms.

10. The phase difference film layered body according to claim 1, wherein the polystyrene-based polymer is selected from the group consisting of polystyrene, poly(alkylstyrene), poly(halogenated styrene), poly(halogenated alkylstyrene), poly(alkoxystyrene), poly(vinylbenzoic acid ester), hydrogenated polymers thereof, and copolymers thereof.

11. The phase difference film layered body according to claim 1, wherein a thickness of the P2 layer is 50 μm to 300 μm.

* * * * *